(12) United States Patent
Shih et al.

(10) Patent No.: US 11,240,720 B2
(45) Date of Patent: Feb. 1, 2022

(54) METHODS, DEVICES, AND SYSTEMS FOR SERVICE-DRIVEN MOBILITY MANAGEMENT

(71) Applicant: FG Innovation Company Limited, Tuen Mun (CN)

(72) Inventors: Mei-Ju Shih, Hsinchu (TW); Chie-Ming Chou, Hsinchu (TW); Yung-Lan Tseng, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 15/996,401

(22) Filed: Jun. 1, 2018

(65) Prior Publication Data

US 2018/0352491 A1    Dec. 6, 2018

Related U.S. Application Data

(60) Provisional application No. 62/514,200, filed on Jun. 2, 2017.

(51) Int. Cl.
*H04W 36/14* (2009.01)
*H04W 8/02* (2009.01)
(Continued)

(52) U.S. Cl.
CPC ............. *H04W 36/14* (2013.01); *H04W 8/02* (2013.01); *H04W 36/0069* (2018.08);
(Continued)

(58) Field of Classification Search
CPC . H04W 36/0069; H04W 36/14; H04W 36/26; H04W 76/15; H04W 76/27; H04W 88/02; H04W 8/02
See application file for complete search history.

(56) References Cited

U.S. PATENT DOCUMENTS

| | | | |
|---|---|---|---|
| 6,178,327 B1* | 1/2001 | Gomez | H04W 24/00 370/216 |
| 6,792,284 B1* | 9/2004 | Dalsgaard | H04W 36/0094 455/525 |

(Continued)

FOREIGN PATENT DOCUMENTS

| | | |
|---|---|---|
| GN | 101536560 A | 9/2009 |
| WO | 2016/190672 A1 | 12/2016 |
| WO | 2017/045644 A1 | 3/2017 |
| WO | 2017045644 A1 | 3/2017 |

OTHER PUBLICATIONS

U.S. Appl. No. 62/454,450 (Year: 2017).*
U.S. Appl. No. 62/472,954 (Year: 2017).*
(Continued)

Primary Examiner — Dung B Huynh
(74) Attorney, Agent, or Firm — ScienBiziP, P.C.

(57) ABSTRACT

A user equipment (UE) includes a processor configured to execute computer-executable instructions to: determine whether a required network slice/service of the UE is supported by a network node; perform at least one of a plurality of mobility management procedures, when the required network slice/service of the UE is not supported by the network node; where the plurality of mobility management procedures includes: selecting another master node (MN), or intra-MN handover or inter-MN handover to another MN; selecting or reselecting a secondary node (SN), intra-SN handover to another SN, modifying an existing SN, or adding a new SN; changing the UE's anchor node to a target new radio (NR) next generation node B (gNB) or a target evolved long term evolution (eLTE) evolved node B (eNB).

18 Claims, 26 Drawing Sheets

(51) Int. Cl.
*H04W 76/27* (2018.01)
*H04W 36/00* (2009.01)
*H04W 88/02* (2009.01)
*H04W 76/15* (2018.01)
*H04W 36/26* (2009.01)

(52) U.S. Cl.
CPC ............ *H04W 76/27* (2018.02); *H04W 36/26* (2013.01); *H04W 76/15* (2018.02); *H04W 88/02* (2013.01)

(56) References Cited

U.S. PATENT DOCUMENTS

| | | | | |
|---|---|---|---|---|
| 9,585,066 | B2* | 2/2017 | Mestanov | H04W 28/08 |
| 9,961,611 | B2* | 5/2018 | Jurzak | H04W 76/14 |
| 10,397,892 | B2* | 8/2019 | Vrzic | H04W 48/18 |
| 2004/0014422 | A1* | 1/2004 | Kallio | H04W 12/0609 455/41.1 |
| 2004/0109425 | A1* | 6/2004 | Scribano | H04W 36/26 370/331 |
| 2005/0197124 | A1* | 9/2005 | Kang | H04W 36/30 455/439 |
| 2006/0111111 | A1* | 5/2006 | Ovadia | H04W 36/38 455/439 |
| 2007/0291699 | A1* | 12/2007 | Lee | H04W 36/26 370/332 |
| 2010/0075677 | A1* | 3/2010 | Wang | H04W 36/0083 455/436 |
| 2010/0329243 | A1* | 12/2010 | Buckley | H04L 65/1069 370/352 |
| 2011/0292859 | A1* | 12/2011 | So | H04W 36/0007 370/312 |
| 2013/0083732 | A1* | 4/2013 | Tiwari | H04W 76/18 370/328 |
| 2013/0176935 | A1* | 7/2013 | Kim | H04W 88/04 370/315 |
| 2014/0086177 | A1* | 3/2014 | Adjakple | H04L 67/10 370/329 |
| 2014/0321432 | A1* | 10/2014 | Li | H04W 36/24 370/331 |
| 2015/0282021 | A1* | 10/2015 | Pao | H04W 48/16 370/331 |
| 2016/0014648 | A1* | 1/2016 | Hamilton | H04W 36/0061 455/436 |
| 2016/0112943 | A1* | 4/2016 | Horn | H04W 8/065 370/329 |
| 2016/0113046 | A1* | 4/2016 | Ahmed | H04W 48/14 370/329 |
| 2016/0142925 | A1* | 5/2016 | Pang | H04W 24/02 370/331 |
| 2016/0277991 | A1* | 9/2016 | Yang | H04W 48/00 |
| 2016/0330660 | A1* | 11/2016 | Wong | H04W 36/0083 |
| 2016/0353465 | A1* | 12/2016 | Vrzic | H04W 28/0247 |
| 2017/0070892 | A1* | 3/2017 | Song | H04L 41/042 |
| 2017/0245310 | A1* | 8/2017 | Chandramouli | H04W 8/20 |
| 2017/0245316 | A1* | 8/2017 | Salkintzis | H04W 76/27 |
| 2017/0295489 | A1* | 10/2017 | Agiwal | H04W 12/04033 |
| 2017/0303259 | A1* | 10/2017 | Lee | H04W 12/08 |
| 2017/0311290 | A1* | 10/2017 | Adjakple | H04W 76/18 |
| 2017/0318450 | A1* | 11/2017 | Salkintzis | H04W 76/14 |
| 2017/0367036 | A1* | 12/2017 | Chen | H04W 76/10 |
| 2018/0041904 | A1* | 2/2018 | Shimojou | H04W 88/18 |
| 2018/0041994 | A1* | 2/2018 | Zhang | H04L 45/02 |
| 2018/0049120 | A1* | 2/2018 | Kelley | H04W 52/0212 |
| 2018/0049267 | A1* | 2/2018 | Chen | H04W 76/27 |
| 2018/0077612 | A1* | 3/2018 | Zheng | H04W 76/27 |
| 2018/0124650 | A1* | 5/2018 | Park | H04W 36/0016 |
| 2018/0124660 | A1* | 5/2018 | Zhang | H04W 84/02 |
| 2018/0124661 | A1* | 5/2018 | Tsai | H04W 36/06 |
| 2018/0124697 | A1* | 5/2018 | Nair | H01Q 1/243 |
| 2018/0132141 | A1* | 5/2018 | Huang-Fu | H04L 65/1083 |
| 2018/0139797 | A1* | 5/2018 | Chun | H04L 41/0681 |
| 2018/0176858 | A1* | 6/2018 | Wang | H04W 48/10 |
| 2018/0199243 | A1* | 7/2018 | Bharatia | H04W 36/0011 |
| 2018/0227873 | A1* | 8/2018 | Vrzic | H04W 76/27 |
| 2018/0234941 | A1* | 8/2018 | Kim | H04W 76/19 |
| 2018/0241635 | A1* | 8/2018 | Rao | H04L 41/14 |
| 2018/0242161 | A1* | 8/2018 | Vulgarakis Feljan | H04W 16/10 |
| 2018/0242224 | A1* | 8/2018 | Pinheiro | H04W 4/70 |
| 2018/0249318 | A1* | 8/2018 | Ianev | H04W 8/065 |
| 2018/0262912 | A1* | 9/2018 | Goldhamer | H04L 69/22 |
| 2018/0262924 | A1* | 9/2018 | Dao | H04W 72/1257 |
| 2018/0270666 | A1* | 9/2018 | Lee | H04W 12/069 |
| 2018/0270696 | A1* | 9/2018 | Duan | H04W 48/02 |
| 2018/0270712 | A1* | 9/2018 | Faccin | H04W 48/16 |
| 2018/0270792 | A1* | 9/2018 | Park | H04W 76/28 |
| 2018/0270894 | A1* | 9/2018 | Park | H04W 76/27 |
| 2018/0279193 | A1* | 9/2018 | Park | H04W 36/08 |
| 2018/0288654 | A1* | 10/2018 | Shih | H04W 48/14 |
| 2018/0317148 | A1* | 11/2018 | Jin | H04W 36/08 |
| 2018/0317264 | A1* | 11/2018 | Agiwal | H04W 52/36 |
| 2018/0324602 | A1* | 11/2018 | Griot | H04W 72/005 |
| 2018/0324645 | A1* | 11/2018 | Park | H04W 76/18 |
| 2018/0324663 | A1* | 11/2018 | Park | H04W 36/08 |
| 2018/0324877 | A1* | 11/2018 | Tiwari | H04W 76/10 |
| 2018/0332442 | A1* | 11/2018 | Shaw | H04W 4/70 |
| 2018/0332523 | A1* | 11/2018 | Faccin | H04W 36/0033 |
| 2018/0343608 | A1* | 11/2018 | Duan | H04W 48/16 |
| 2018/0352501 | A1* | 12/2018 | Zhang | H04W 48/18 |
| 2018/0368140 | A1* | 12/2018 | Centonza | H04W 72/0426 |
| 2018/0376384 | A1* | 12/2018 | Youn | H04W 8/02 |
| 2018/0376407 | A1* | 12/2018 | Myhre | H04W 76/27 |
| 2019/0014515 | A1* | 1/2019 | Zee | H04W 48/18 |
| 2019/0021047 | A1* | 1/2019 | Zong | H04W 76/11 |
| 2019/0037409 | A1* | 1/2019 | Wang | H04W 16/04 |
| 2019/0058997 | A1* | 2/2019 | Futaki | H04W 76/27 |
| 2019/0082490 | A1* | 3/2019 | Zhang | H04W 48/16 |
| 2019/0098544 | A1* | 3/2019 | Han | H04W 36/0044 |
| 2019/0098545 | A1* | 3/2019 | Zhang | H04W 36/22 |
| 2019/0123963 | A1* | 4/2019 | Tang | H04L 45/64 |
| 2019/0132790 | A1* | 5/2019 | Lee | H04W 8/08 |
| 2019/0158360 | A1* | 5/2019 | Xu | H04L 41/12 |
| 2019/0159119 | A1* | 5/2019 | Djordjevic | H04W 8/18 |
| 2019/0174368 | A1* | 6/2019 | Decarreau | H04W 36/0038 |
| 2019/0174391 | A1* | 6/2019 | Ode | H04W 80/02 |
| 2019/0174406 | A1* | 6/2019 | Hwang | H04W 36/0066 |
| 2019/0174554 | A1* | 6/2019 | Deenoo | H04W 80/02 |
| 2019/0182884 | A1* | 6/2019 | Deenoo | H04W 76/18 |
| 2019/0191348 | A1* | 6/2019 | Futaki | H04W 36/12 |
| 2019/0223093 | A1* | 7/2019 | Watfa | H04W 48/18 |
| 2019/0238270 | A1* | 8/2019 | Pan | H03M 13/09 |
| 2019/0246319 | A1* | 8/2019 | Lee | H04W 36/0061 |
| 2019/0261233 | A1* | 8/2019 | Duan | H04W 36/0066 |
| 2019/0289666 | A1* | 9/2019 | Backman | H04W 80/045 |
| 2019/0319686 | A1* | 10/2019 | Chen, IV | H04W 72/046 |
| 2019/0349792 | A1* | 11/2019 | Xu | H04L 41/042 |
| 2019/0349906 | A1* | 11/2019 | Futaki | H04W 72/04 |
| 2019/0357122 | A1* | 11/2019 | Li | H04W 76/27 |
| 2019/0357129 | A1* | 11/2019 | Park | H04W 60/00 |
| 2019/0357131 | A1* | 11/2019 | Sivavakeesar | H04W 36/0016 |
| 2019/0373520 | A1* | 12/2019 | Sillanpaa | H04W 36/14 |
| 2019/0380104 | A1* | 12/2019 | Vrzic | H04W 76/12 |
| 2019/0394651 | A1* | 12/2019 | Wifvesson | H04L 63/0428 |
| 2019/0394783 | A1* | 12/2019 | Byun | H04W 72/082 |
| 2020/0022033 | A1* | 1/2020 | Wei | H04W 36/0055 |
| 2020/0037214 | A1* | 1/2020 | Jin | H04W 36/0058 |
| 2020/0068473 | A1* | 2/2020 | Tang | H04W 36/00837 |
| 2020/0235989 | A1* | 7/2020 | Sun | H04W 16/28 |
| 2020/0305041 | A1* | 9/2020 | Fan | H04W 74/0833 |

OTHER PUBLICATIONS

Joern Krause, "Study on New Radio Access Technology; Radio Access Architecture and Interfaces", 3GPP TR 38.801 V14.0.0, Apr. 3, 2017(Apr. 3, 2017).

Joern Krause, "Study on New Radio Access Technology; Radio Interface Protocol Aspects", 3GPP TR 38.804 V14.0.0, Mar. 24, 2017 (Mar. 24, 2017).

ERICSSON Chairman notes, 3GPP TSG-RAN WG2 Meeting #102, May 25, 2018(May 25, 2018).

(56) References Cited

OTHER PUBLICATIONS

Maurice Pope, "Study on Architecture for Next Generation System", 3GPP TR 23.799 V14.0.0, Dec. 16, 2016 (Dec. 16, 2016).

LG Electronics Inc. SA WG2 Meeting #116BIS S2-165256 Solution on Network Slice Instance Reselection Sep. 2, 2016 (Sep. 2, 2016) pp. 3-5.

Nokia et al., "NAS/AS modeling for NR IDLE", R2-1704294, 3GPP TSG-RAN WG2 Meeting #98, Hangzhou, China, May 15-19, 2017.

ZTE, "MM procedure impact for network slicing", C1-172092, 3GPP TSG-CT WG1 Meeting #104, Zhangjiajie, P.R of China, May 15-19, 2017.

Huawei et al., "Slice Availability for Cell (Re-)Selection", R2-1704973, 3GPP TSG-RAN WG2#98, Hangzhou, China, May 15-19, 2017.

ZTE, "Some Issues with NW Slicing in Multiple Connectivity Contexts", R3-162122, 3GPP TSG RAN WG3 Meeting#93bis, Sophia-Antipolis, France, Oct. 10-14, 2016.

LG Electronics Inc., "Solution on Network Slice Instance Reselection", S2-165256, SA WG2 Meeting #116BIS, Aug. 29-Sep. 2, 2016, Sanya, P.R China.

\* cited by examiner

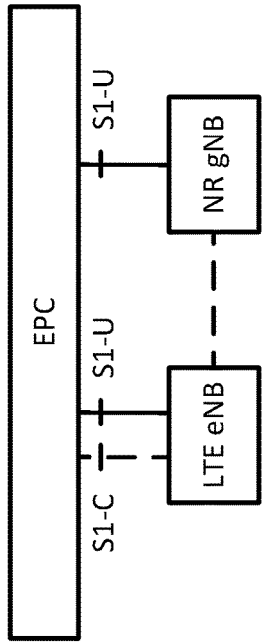
FIG. 1B
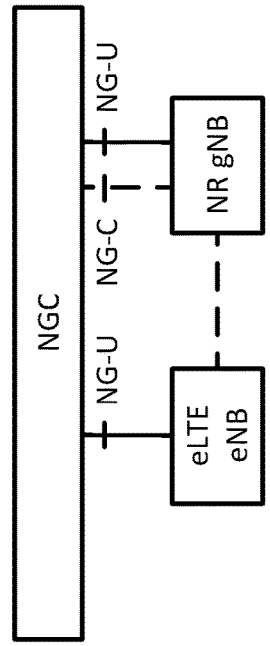
FIG. 2B
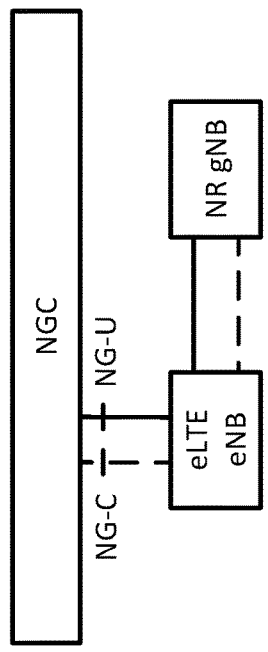
FIG. 3B
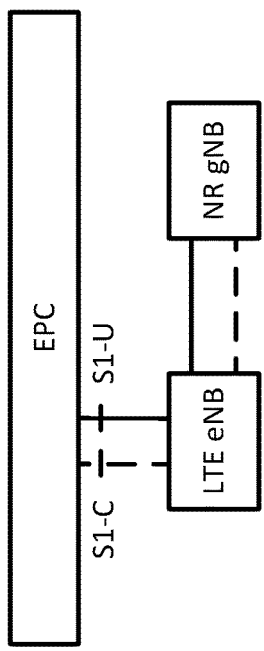
FIG. 1A
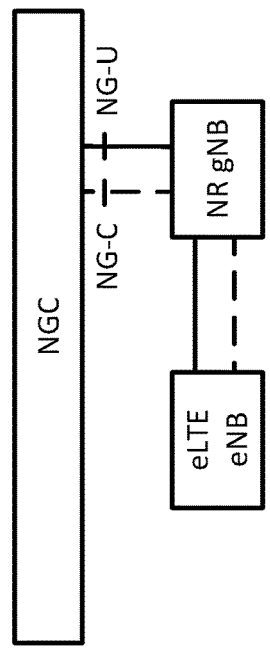
FIG. 2A
FIG. 3A

METHODS, DEVICES, AND SYSTEMS FOR SERVICE-DRIVEN MOBILITY MANAGEMENT

CROSS REFERENCE TO RELATED APPLICATIONS

This application claims the benefit of and priority to U.S. Provisional Application No. 62/514,200 filed on Jun. 2, 2017 and entitled "METHODS AND SYSTEMS FOR SERVICE-DRIVEN MOBILITY MANAGEMENT".

TECHNICAL FIELD

The present disclosure generally relates to wireless communication methods, and more particularly, to methods, devices, and systems for service-driven mobility management for enhanced Long-Term Evolution (eLTE) and New Radio (NR) tight interworking.

BACKGROUND

Under the next generation (e.g., $5^{th}$ generation new radio) network architecture, the Evolved Universal Terrestrial Radio Access (E-UTRA) and New Radio tight interworking (also referred to as "LTE-NR tight interworking") is a key feature for NR Non-Standalone (NSA) deployments. The LTE-NR tight interworking can also be regarded as a transition from legacy LTE deployments to NR Standalone (SA) deployments. The 5G NR network architecture includes several options, among which Option 3/3A/3X, Option 4/4A, and Option 7/7A are variants of the LTE-NR tight interworking.[1]

FIGS. 1A and 1B illustrate Options 3 and 3A, respectively, where Options 3 and 3A are examples of E-UTRA-NR Dual Connectivity (EN-DC). Options 3 and 3A each include an LTE eNB as an anchor node coupled to an Evolved Packet Core (EPC), and an NR next generation Node B (gNB) coupled to the LTE eNB. In FIG. 1A, the LTE eNB connects to the EPC through an S1-C interface for control plane transmissions and an S1-U interface for user plane transmissions. The NR gNB control plane connects to the EPC through the LTE eNB, where an Xx/Xn interface couples the LTE eNB and the NR gNB. The NR gNB user plane also connects to the EPC through the LTE eNB. In FIG. 1B, the anchor LTE eNB connects to the EPC through an S1-C interface for control plane transmissions and an S1-U interface for user plane transmissions. The NR gNB control plane connects to the EPC through the LTE eNB, where an Xx/Xn interface couples the LTE eNB and the NR gNB. Different from FIG. 1A, in FIG. 1B, the NR gNB user plane may connect directly to the EPC through an S1-U interface.

FIGS. 2A and 2B illustrate Options 4 and 4A, respectively, where Options 4 and 4A are examples of NR E-UTRA Dual Connectivity (NE-DC). Options 4 and 4A each include an NR gNB as an anchor node coupled to a Next Generation Core (NGC), which is also known as a 5G-Core Network (5G-CN) or a 5G Core Network (5GC). Options 4 and 4A also each include an eLTE eNB coupled to the NR gNB. It is noted that eLTE is a radio access technology with one or more next-generation evolved nodeBs (ng-eNBs) connected to a 5GC, where the ng-eNBs may also be referred to as eLTE eNBs. In this disclosure, we can use eLTE, ng-eNB, and LTE connected to 5GC, interchangeably. In FIG. 2A, the NR gNB connects to the NGC through an NG-C interface for control plane transmissions

[col 2]

and an NG-U interface for user plane transmissions. The eLTE eNB control plane connects to the NGC through the NR gNB, where an Xx/Xn interface couples the eLTE eNB and the NR gNB. The eLTE eNB user plane also connects to the NGC through the NR gNB. In FIG. 2B, the NR gNB connects to the NGC through an NG-C interface for control plane transmissions and an NG-U interface for user plane transmissions. The eLTE eNB control plane connects to the NGC through the NR gNB, where an Xx/Xn interface couples the eLTE eNB and the NR gNB. Different from FIG. 2A, in FIG. 2B, the eLTE eNB user plane may connect directly to the NGC through an NG-U interface.

FIGS. 3A and 3B illustrate Options 7 and 7A, respectively, where Options 7 and 7A are examples of Next Generation E-UTRA-NR Dual Connectivity (NG EN-DC). Options 7 and 7A each include an eLTE eNB as an anchor node coupled to an NGC (e.g., 5G-CN or 5GC). Options 7 and 7A also each include an NR gNB coupled to the eLTE eNB. In FIG. 3A, the eLTE eNB connects to the NGC through an NG-C interface for control plane transmissions and an NG-U interface for user plane transmissions. The NR gNB control plane connects to the NGC through the eLTE eNB, where an Xx/Xn interface couples the NR gNB and the eLTE eNB. The NR gNB user plane also connects to the NGC through the eLTE eNB. In FIG. 3B, the eLTE eNB connects to the NGC through an NG-C interface for control plane transmissions and an NG-U interface for user plane transmissions. The NR gNB control plane connects to the NGC through the eLTE eNB, where an Xx/Xn interface couples the NR gNB and the eLTE eNB. Different from FIG. 3A, in FIG. 3B, the NR gNB user plane may connect directly to the NGC through an NG-U interface.

It should be noted that the term, "eLTE", is only used in the study phase of TR 38.801, for example. This term may not be used in normative specifications. However, in the present application, the term "eLTE" in the present application may include, but is not limited to, the definition in the study phase of TR 38.801 and any communication standard with equivalent functionalities. An eLTE eNB is an evolution of eNB that supports connectivity to both an EPC and an NGC, or to an NGC only. An eLTE eNB can also be referred to a next generation evolved Node B (ng-eNB), which is an LTE eNB connected to a 5GC. In the present application, eLTE, ng-eNB, and LTE connected to 5GC may be used interchangeably. In addition, an LTE eNB may not support 5G features such as network slice in Radio Access Network (RAN), while an eLTE eNB can support 5G features with higher layer network slice support. For example, an LTE eNB may directly connect to an EPC, but not to an NGC. An eLTE eNB may directly connect to both an EPC and an NGC, or to an NGC only. An NR gNB may support 5G features such as network slice in RAN with all layers (e.g., including SDAP (Service Data Adaptation Protocol), PDCP (Packet Data Convergence Protocol), RLC (Radio Link Control), MAC (Medium Access Control), PHY (Physical layer) layers), and etc. It is also noted that the terms, NGC, 5GC and 5G-CN may be used interchangeably throughout the present application.

In the current NR study phase, LTE-NR tight interworking is agreed to have dual connectivity (DC), which may be similar to Rel-12 dual connectivity.[2] The LTE eNBs, eLTE eNBs, and NR gNBs can each be a master node and/or a secondary node. Among other differences from the Rel-12 DC, in the 5G NR architecture, a secondary node may have its own Radio Resource Control (RRC) entity.

As presented in each of FIGS. 4A and 4B, a user equipment (UE) is coupled to a master node and a secondary node, where the master node and the secondary node each have their own RRC entity. The UE has a single RRC state machine that follows the RRC state of the master node. Each node generates RRC Packet Data Units (PDUs) and inter-node PDUs using ASN.1.[3] In an embedded approach, the RRC PDUs and inter-node PDUs generated by the secondary node can be embedded with the RRC PDUs generated by the master node, and be transported through the master node to the UE. The embedded approach is used for the first configuration, for the secondary node RRC reconfiguration requiring the master node RRC reconfiguration, and for the master node RRC reconfiguration requiring the secondary node RRC reconfiguration. In a direct approach, once the UE is configured to establish a Signaling Radio Bearer (SRB) in a Secondary Cell Group (SCG), the RRC PDUs generated by the secondary node can be sent directly between the secondary node and the UE. The direct approach (e.g., SCG SRB) is used for the secondary node RRC reconfiguration not requiring any coordination with the master node, and for mobility measurement report within the secondary node. In an SCG split SRB approach, the RRC PDUs and inter-node PDUs generated by the secondary node are transmitted through the lower layers (e.g., RLC, MAC, and/or PHY layers) of the master node.

In addition to LTE-NR tight interworking, network slice is another important feature of the 5G NR network architecture. With network slice, an operator can create a network customized to a specific market scenario or for a specific service, which demands specific requirements.[4] To support network slice, Network Slice Selection Assistance Information (NSSAI) may be applied, which includes one or more Single Network Slice Selection Assistance Information (S-NSSAI). Each network slice may be uniquely identified by an S-NSSAI, which also represents the slice ID used for signaling between a Radio Access Network (RAN) and a Core Network (CN).

In a 5G-CN, a Network Slice Selection Function (NSSF) can select an appropriate network slice ID for a UE to satisfy its service requirement. A Network Slice Template (NST) may include a logical network function and resource requirements necessary to provide the required/requested service. A Network Slice Instance (NSI) is an instance created from an NST. Thus, network slice is also known as a concept for describing a system behavior implemented through NSIs.[5] Each NSI is associated with a network slice type ID (NS-ID), used to identify the type of slice.

Currently, an LTE eNB connecting to an EPC may not support network slice. That is, an LTE eNB does not have service differentiation, and cannot read the network slice specific messages. Furthermore, an NR gNB and an eLTE eNB each have their own network slice capabilities, but the NR gNB and the eLTE eNB may not support all the services.

Although LTE-NR tight interworking and network slice are important features of the 5G NR architecture, not all Radio Access Technologies (RATs) in the LTE-NR tight interworking deployments support network slice.

Thus, it is desirable that LTE-NR tight interworking can support the network slice, especially when an NR gNB serves as the anchor node and connected to a 5G-CN. It is also desirable that the NR gNB/cell can support the RAN part of slicing (e.g., RAN part of network slice, via multiple numerologies/TTI (Transmission Time Interval) lengths, RAN part configuration of network slice), and the eLTE eNB/cell can support the higher layer network slicing. In addition, when a UE is configured with LTE-NR interworking, which may include many deployment scenarios, it is important to make sure that the UE connects to a suitable/appropriate RAT, which can support the UE's desired network slice(s)/service(s). For example, the UE may be suggested to camp to an appropriate RAT that can support its service during cell selection/reselection. For example, when the UE is in RRC_CONNECTED state and needs new network slice(s)/service(s), the UE may be suggested to connect to an appropriate RAT, which can further support the UE's new network slice(s)/service(s) requirement(s).

SUMMARY

The present disclosure is directed to methods, devices, and systems for service-driven mobility management.

In a first aspect of the present application, a user equipment (UE) is disclosed, the UE comprising: a non-transitory computer-readable medium storing computer-executable instructions; at least one processor coupled to the non-transitory computer-readable medium, and configured to execute the computer-executable instructions to: determine whether a required network slice/service of the UE is supported by a network node; perform at least one of a plurality of mobility management procedures, when the required network slice/service of the UE is not supported by the network node; wherein the plurality of mobility management procedures includes: selecting another master node (MN), or intra-MN handover or inter-MN handover to another MN; selecting or reselecting a secondary node (SN), intra-SN handover to another SN, modifying an existing SN, or adding a new SN; changing the UE's anchor node to a target new radio (NR) next generation node B (gNB) or a target evolved long term evolution (eLTE) evolved node B (eNB).

In an implementation of the first aspect, the at least one processor is further configured to execute the computer-executable instructions to: send a System Information (SI) request to the network node; and receive network slice capability in other SI broadcast or unicast by the network node; wherein the network slice capability indicates one or more network slices or services supported by the network node.

In another implementation of the first aspect, at least one of the minimum SI or the other SI includes at least one of a Slice ID, a Network Slice Indication, or a Slice Bitmap.

In another implementation of the first aspect, the at least one processor is further configured to execute the computer-executable instructions to: send a radio resource control (RRC) message to the network node for network slice support information of at least one neighboring network node; receive the network slice support information of the at least one neighboring network node from the other SI broadcast or unicast by the network node; determine, based on the network slice support information, whether the required network slice/service of the UE is supported by the at least one neighboring network node.

In another implementation of the first aspect, the network node is connected to a 5G core network.

In another implementation of the first aspect, when selecting the another MN or selecting or reselecting the SN, the UE measures signals from a list of neighboring network nodes broadcast or unicast by the network node, and selects the another MN or the SN based on the measurement.

In another implementation of the first aspect, the UE receives a radio access network (RAN) notification area update through a 5G core network, the RAN notification area update includes at least one of a list of NR gNB/cell IDs or a list of RAN area IDs, wherein the list of NR gNB/cell IDs corresponds to a list of NR gNB s/cells that support the required network slice/service of the UE, and the list of RAN area IDs corresponds to a list of the RAN areas that support the required network slice/service of the UE.

In another implementation of the first aspect, a Non-Access Stratum (NAS) of the UE provides the information of the required network slice/service to an Access Stratum (AS) of the UE; the AS monitors signals from the network node; the AS identifies the required network slice/service through at least one of a Slice ID, a Network Slice Indication, and a Slice Bitmap from the signals.

In another implementation of the first aspect, the UE is configured to have a list of barred cells that do not support the required network slice capability.

In a second aspect of the present application, a network node is disclosed, the network node comprising: a non-transitory computer-readable medium storing computer-executable instructions; at least one processor coupled to the non-transitory computer-readable medium, and configured to execute the computer-executable instructions to: provide network slice capability of the network node to a user equipment (UE); perform at least one of a plurality of mobility management procedures, when the network slice capability of the network node does not support a required network slice/service of the UE; wherein the plurality of mobility management procedures includes: selecting another master node (MN), or intra-MN handover or inter-MN handover to another MN; selecting or reselecting a secondary node (SN), intra-SN handover to another SN, or modifying an existing SN; adding a new SN; changing the UE's anchor node to a target new radio (NR) next generation node B (gNB) or a target evolved long term evolution (eLTE) evolved node B (eNB).

In an implementation of the second aspect, the network node of Claim 10, wherein the network node is in a master cell group or a secondary cell group.

In another implementation of the second aspect, the network node is connected to a 5G core network.

In another implementation of the second aspect, the network slice capability is broadcast or unicast by the network node via minimum SI or other SI.

In another implementation of the second aspect, at least one of the minimum SI or the other SI includes at least one of a Slice ID, a Network Slice Indication, or a Slice Bitmap.

In another implementation of the second aspect, the network slice capability is broadcast or unicast through a Signaling Radio Bearer (SRB).

In another implementation of the second aspect, the at least one processor is further configured to execute the computer-executable instructions to: receive an SI request from the UE; and broadcast or unicast the network slice capability in other SI to the UE.

In another implementation of the second aspect, the at least one processor is further configured to execute the computer-executable instructions to: broadcast or unicast network slice support information of at least one neighboring network node to the UE.

In another implementation of the second aspect, the at least one neighboring network node is connected to a 5G core network.

In another implementation of the second aspect, the network node provides the UE a radio access network (RAN) notification area update through the 5G core network, the RAN notification area update includes at least one of a list of NR gNB/cell IDs or a list of RAN area IDs, wherein the list of NR gNB/cell IDs corresponds to a list of NR gNBs/cells that support the required network slice/service of the UE, and the list of RAN area IDs corresponds to a list of the RAN areas that support the required network slice/service of the UE.

In another implementation of the second aspect, the network node provides a list of barred cells that do not support the required network slice capability to the UE.

BRIEF DESCRIPTION OF THE DRAWINGS

FIGS. 1A and 1B are diagrams illustrating 5G architectures.

FIGS. 2A and 2B are diagrams illustrating 5G architectures.

FIGS. 3A and 3B are diagrams illustrating 5G architectures.

DETAILED DESCRIPTION

Figure 4A:
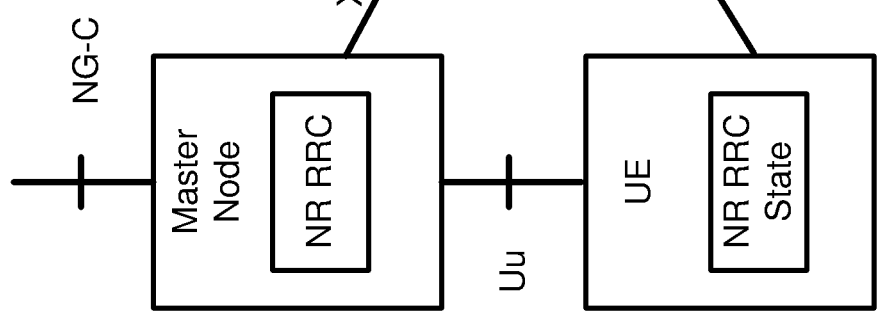
FIGS. 4A and 4B are diagrams illustrating control plane architectures for LTE/eLTE and NR tight interworking.
Figure 4B:
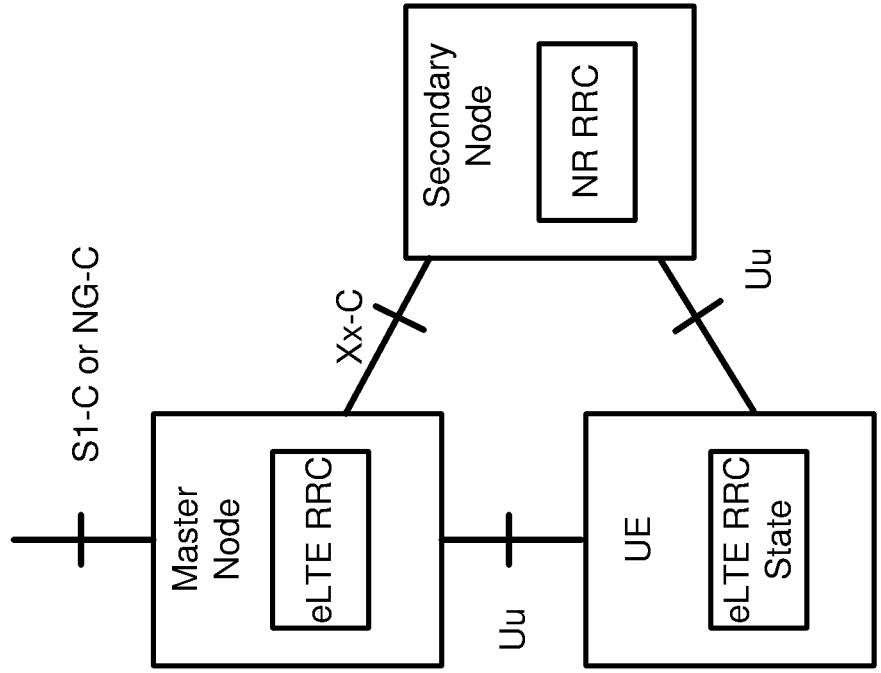

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

In some implementations, this disclosure may include the language, for example, "at least one of [element A] or [element B]". This language may refer to one or more of the elements. For example, "at least one of A or B" may refer to "A", "B", or "A and B". In other words, "at least one of A or B" may refer to "at least one of A and at least one of B," or "at least of either A or B." In some implementations, this disclosure may include the language, for example, "[element A], [element B], and/or [element C]." This language may refer to either of the elements or any combination thereof. In other words, "A, B, and/or C" may refer to "A", "B", "C", "A and B", "A and C", "B and C", or "A, B, and C".

In some of the exemplary implementations, an EPC may not support network slice, unlike the NGC (e.g., 5G-CN and 5GC) which may support network slice. In some of the exemplary implementations, an LTE eNB may not support network slice, unlike the eLTE eNB and NR gNB which may support network slice. In some of the exemplary implementations, an eLTE eNB/cell may not support RAN part of slicing (e.g., RAN part of network slice, via multiple numerologies/TTI lengths, RAN part configuration of network slice), but may support network slice from RRC, SDAP, and PDCP layers. In some of the exemplary implementations, an NR gNB/cell may support RAN part of slicing from an RRC layer and an SDAP layer to a PHY layer (e.g., via different numerologies/TTI lengths). When a CN is a 5G-CN, the CN may support the storage and selection of network slice. For example, a 5G-CN may store the network slice/service information (e.g., NS-IDs, S-NSSAIs, and/or slice IDs) of each registered NR gNB/cell and eLTE eNB/cell. The 5G-CN may also select the proper NR gNB/cell and eLTE eNB/cell for the UE's network slice/service request. It is noted that the capabilities of network slice/service supported by each RAT/cell may be different. In some of the exemplary implementations, an eLTE eNB and/or NR gNB may not have the capability to support all network slices/services defined by the core network. In some of the exemplary implementations, the capabilities of these network entities are summarized in Table 1. It is noted that the network slices/services supported by RATs may be a subset of the network slices/services supported by the CN.

TABLE 1

Network Slice Capability of Different Network Entities

| | Radio Access Technology | | | Core Network | |
|---|---|---|---|---|---|
| | NR gNB | eLTE eNB | LTE eNB | 5G-CN | EPC |
| Network Slice | Supported | Supported | | Supported | |

Figure 5B:
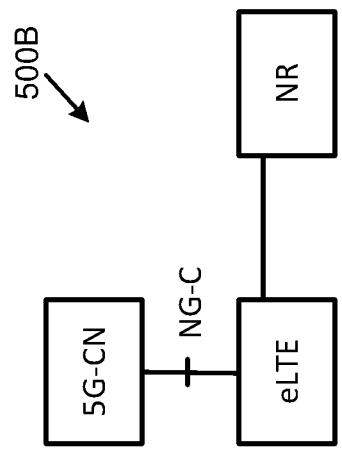
FIG. 5B is a diagram illustrating eLTE and NR tight interworking with an eLTE anchor node connected to a 5G-CN, according to an exemplary implementation of the present disclosure.
Figure 5D:
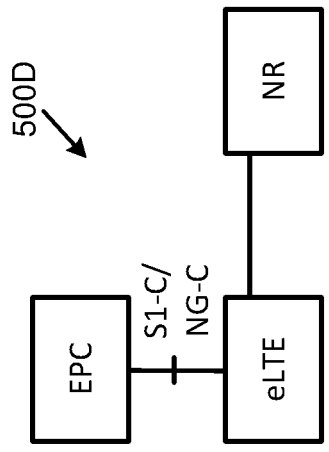
FIG. 5D is a diagram illustrating eLTE and NR tight interworking with an eLTE anchor node connected to an EPC, according to an exemplary implementation of the present disclosure.
Figure 5A:
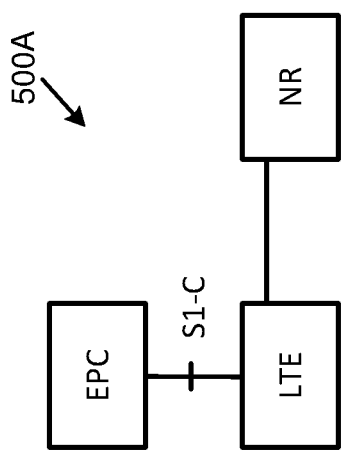
FIG. 5A is a diagram illustrating LTE and NR tight interworking with an LTE anchor node connected to an EPC, according to an exemplary implementation of the present disclosure.
Figure 5C:
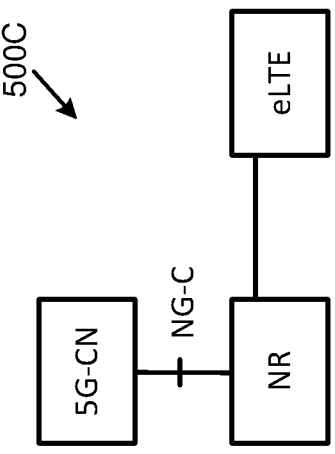
FIG. 5C is a diagram illustrating eLTE and NR tight interworking with an NR anchor node connected to a 5G-CN, according to an exemplary implementation of the present disclosure.

In some of the exemplary implementations, NR gNBs and eLTE eNBs may generate/read/transmit/receive/forward network slice/service related RRC messages. The NR gNBs and eLTE eNBs may support SDAP and PDCP to connect to a 5GC. The NR gNBs may further provide RAN part of slicing (e.g., RAN part of network slice, via multiple numerologies/TTI lengths, RAN part configuration of network slice) to support different network slices/services. Based on the 5G NR architecture and the capability of network slice of each network entity, four cases of interest are shown in FIGS. 5A, 5B, 5C, and 5D, where control plane connections are shown. In FIG. 5A, Case 500A refers to LTE and NR tight interworking and LTE as the anchor connecting to EPC. In FIG. 5B, Case 500B refers to eLTE and NR tight interworking and eLTE as the anchor connecting to the 5G-CN (e.g., Next Generation E-UTRAN NR Dual Connectivity, NGEN-DC). In FIG. 5C, Case 500C refers to eLTE and NR tight interworking (e.g., NR E-UTRAN Dual Connectivity, NE-DC) and NR as the anchor connecting to the 5G-CN. In FIG. 5D, Case 500D refers to eLTE and NR tight interworking and eLTE as the anchor connecting to the EPC.

In the implementations illustrated in Case 500B of FIG. 5B, Case 500C of FIG. 5C, and Case 500D of FIG. 5D, the master node and secondary node may be either an eLTE eNB/cell or an NR gNB/cell, and the core network may be either an EPC or a 5G-CN. In other words, the eLTE eNB/cell can be either a master node or a secondary node. When the eLTE eNB/cell is the master node, the secondary node is NR gNB/cell, and the core network is EPC in Case 500D or 5GC in Case 500B. When the eLTE eNB/cell is the secondary node, the master node is an NR gNB/cell, and the core network is 5GC in Case 500C. The objective is to ensure that the UE configured with eLTE-NR tight interworking, such as in Cases 500B, 500C, and 500D, can connect to the appropriate RAT, which supports the UE's required/requested or updated network slices and/or services.

There are several cases where a UE may need assistance to connect to a suitable node that supports the UE's specific network slice(s) and/or service(s). For example, when a UE performs initial access, the UE may connect to a master node, which cannot support its network slice and/or service requirements. In another case, even after the UE performs initial access and connects to a suitable master node, which supports its initial network slice, the master node may become unsuitable when the UE changes/updates the network slice, for example, in RRC_CONNECTED state. In another case, a UE with network slice capability turns to the secondary node for the network slice/service. Exemplary implementations of the present application describe various methods/mechanisms for ensuring a UE connect to a suitable node, which supports the UE's specific network slice(s) and/or service(s).

It is noted that the cell IDs and base station IDs in the present application may refer to NR gNB ID, NR cell ID, (e)LTE eNB ID, (e)LTE cell ID, global unique base station ID (e.g., PLMN ID plus eNB ID for LTE), unique base station ID in a PLMN (e.g., eNB ID for LTE), NR/E-UTRAN Cell Identity (e.g., eNB ID plus cell ID for LTE), global NR/E-UTRAN Cell Identity (e.g., PLMN ID plus eNB ID plus cell ID for LTE, Tracking Area Code plus PLMN ID plus cell ID for NR), PCI (Physical Cell Identifier) which is derived from PSS (Primary Synchronization Signals) and/or SSS (Secondary Synchronization Signals).

Case 1: UE Reveals its Network Slice Capability to eLTE eNB/Cell.

A UE may reveal its network slice capability and/or requirement to an eLTE eNB/cell through an RRC message. The eLTE eNB/cell may be a master node/cell in a Master Cell Group (MCG) as shown in FIGS. 5B and 5D, or a secondary node/cell in a Secondary Cell Group (SCG) as shown in FIG. 5C.

Figure 6:
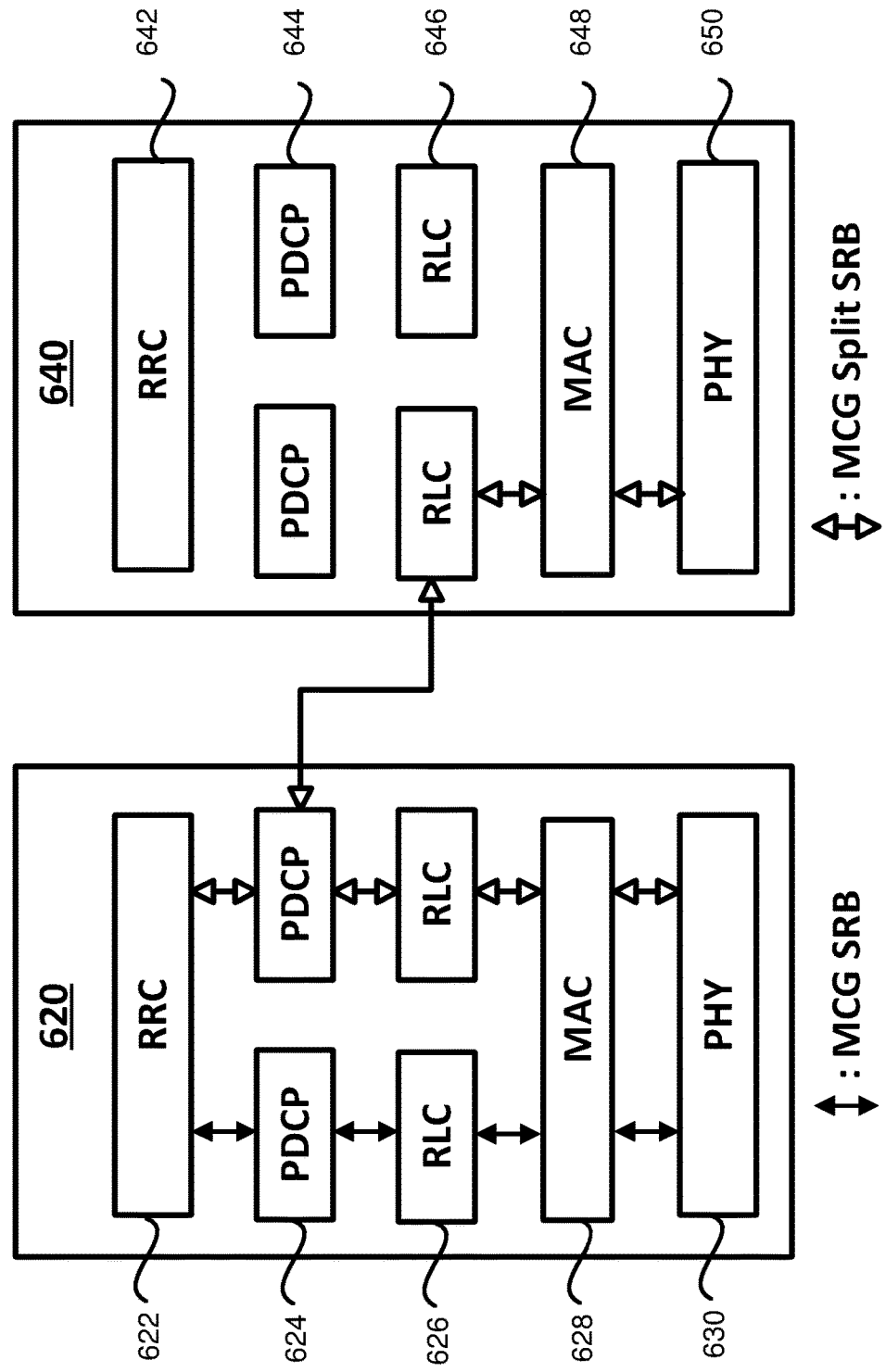
FIG. 6 is a diagram illustrating an MCG SRB and an MCG split SRB with an eLTE eNB/cell as a master node, according to an exemplary implementation of the present disclosure.

FIG. 6 is a diagram illustrating an MCG SRB and an MCG split SRB with an eLTE eNB/cell as a master node, according to an exemplary implementation of the present disclosure. As shown in FIG. 6, when eLTE eNB/cell 620 is a master node, the control signaling revealing a UE's network slice capability, between the UE and eLTE eNB/cell 620, may be provided through one or more MCG Signaling Radio Bearers (SRBs) and/or one or more MCG split SRBs. As shown in FIG. 6, eLTE eNB/cell 620 may be a master node in an MCG, and may include RRC layer 622, PDCP layer 624, RLC layer 626, MAC layer 628, and PHY layer 630. NR gNB/cell 640 may be a secondary node in an SCG, and may include RRC layer 642, PDCP layer 644, RLC layer 646, MAC layer 648, and PHY layer 650. The control signaling revealing the UE's network slice capability, between the UE and eLTE eNB/cell 620, may be provided through an MCG SRB via RRC layer 622, PDCP layer 624, RLC layer 626, MAC layer 628, and PHY layer 630 of eLTE eNB/cell 620. Instead of, or in addition to, the control signaling being provided through the MCG SRB, the control signaling revealing the UE's network slice capability, between the UE and eLTE eNB/cell 620, may be provided through an MCG split SRB, via RRC layer 622 and PDCP layer 624 of eLTE eNB/cell 620, and via RLC layer 646, MAC layer 648, and PHY layer 650 of NR gNB/cell 640 (e.g., secondary node in an SCG).

Figure 7:
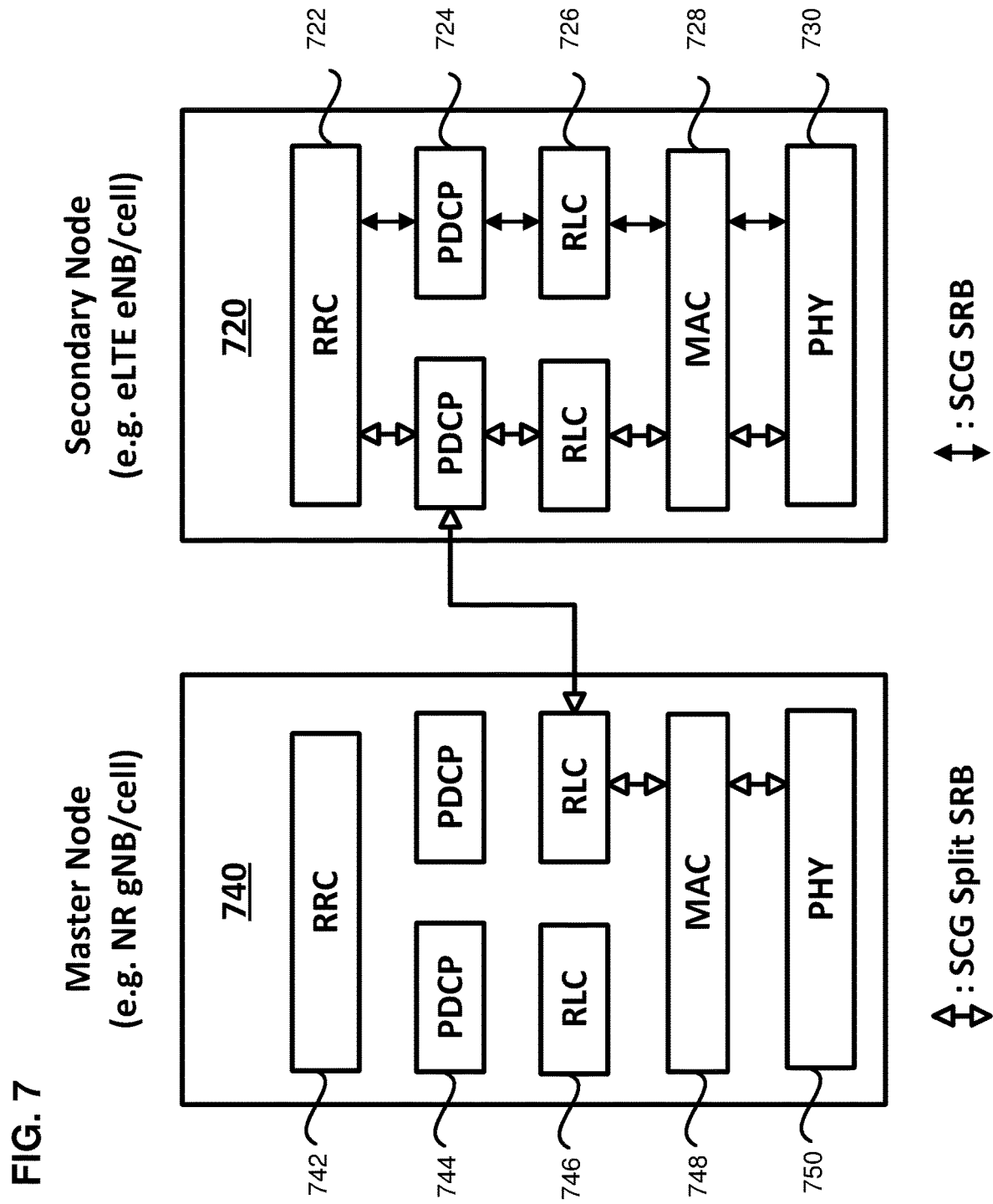
FIG. 7 is a diagram illustrating an SCG SRB and an SCG split SRB with an eLTE eNB/cell as a secondary node, according to an exemplary implementation of the present disclosure.

FIG. 7 is a diagram illustrating an SCG SRB and an SCG split SRB with an eLTE eNB/cell as a secondary node, according to an exemplary implementation of the present disclosure. It is noted that SCG SRB may also be regarded as SRB3. As shown in FIG. 7, when eLTE eNB/cell 720 is a secondary node, the control signaling revealing the UE's network slice capability, between the UE and eLTE eNB/cell 720, may be provided through one or more SCG SRBs and/or one or more SCG split SRBs. As shown in FIG. 7, NR gNB/cell 740 may be a master node in an MCG, and may include RRC layer 742, PDCP layer 744, RLC layer 746, MAC layer 748, and PHY layer 750. eLTE eNB/cell 720 is a secondary node in an SCG, and may include RRC layer 722, PDCP layer 724, RLC layer 726, MAC layer 728, and PHY layer 730. The control signaling revealing the UE's network slice capability, between the UE and eLTE eNB/cell 720, can be provided through an SCG SRB via RRC layer 722, PDCP layer 724, RLC layer 726, MAC layer 728, and PHY layer 730 of eLTE eNB/cell 720. Instead of, or in addition to, the control signaling being provided through the SCG SRB, the control signaling revealing the UE's network slice capability, between the UE and eLTE eNB/cell 720, may be provided through an SCG split SRB, via RRC layer 722 and PDCP layer 724 of eLTE eNB/cell 720, and via RLC layer 746, MAC layer 748, and PHY layer 750 of NR gNB/cell 740 (e.g., the master node in an MCG).

As illustrated in FIGS. 8, 9, 12A and 12B, a UE reveals its network slice capability and/or service requirement for network slice in an RRC message (e.g., RRC Connection Request or RRC Connection Setup Complete or RRC Connection Establishment or RRC System Information Request). The RRC message may include a UE ID to reveal the UE identity. The RRC message may include slice IDs and/or network slice type ID (NS-ID) to directly identify the type of network slice and/or required/requested service the UE needs. In another exemplary implementation, a slice bitmap may be used to directly identify the type of network slice and/or required/requested service in the RRC message. For example, the slice bitmap may include preconfigured N bits (e.g., N supported network slices/services), with a bit "1" meaning the corresponding network slice/service is supported, and a bit "0" meaning the corresponding network slice/service is not supported.

It should be noted that, in the present application, slice IDs in all figures are used for illustration purpose only. That is, the slice IDs can be replaced with slice bitmaps to identify the indicated network slices/services. The cause value in an RRC message may be 'network slice' corresponding to a NAS (Non-Access Stratum) procedure. Moreover, the RRC message may carry the network slice indication (NS Indication), to indicate the network slice requirement instead of explicitly revealing the slice service type.

In exemplary implementations of the present application, the eLTE eNB/cell, after receiving the RRC message, may take the following actions: Case 1A—reject through an RRC message without providing any further information; Case 1B—reject through an RRC message and provide assisting information in the RRC message; Case 1C—accept through an RRC message. It should be noted that the RRC message exchange between the UE and the eLTE eNB is not limited to the eLTE eNB as a master node or a secondary node under dual-connectivity operation. For example, the RRC message exchange between the UE and the eLTE eNB may also be applicable when the eLTE eNB is a standalone node.

Case 1A: eLTE eNB/Cell Rejects UE's Request without Providing Further Information.

Figure 8:
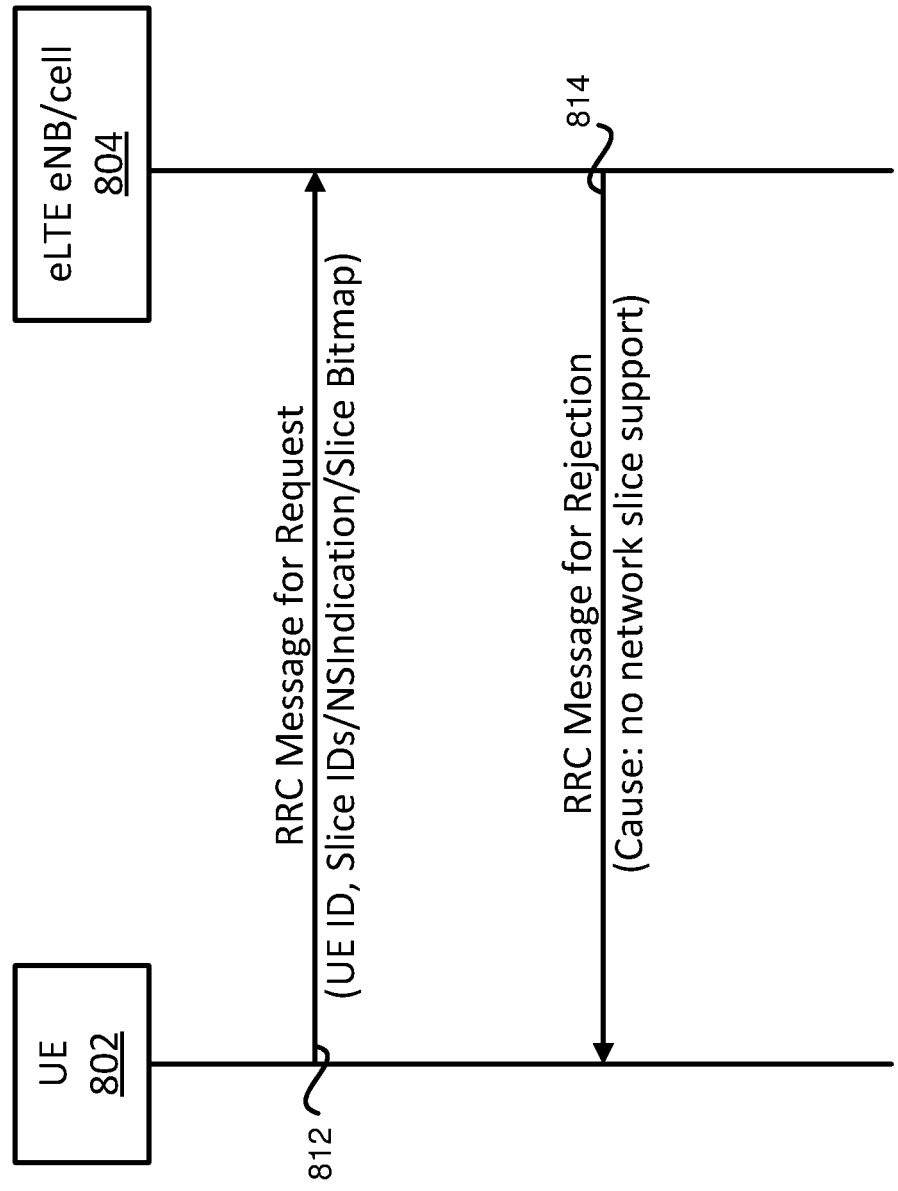
FIG. 8 is a diagram illustrating an eLTE eNB/cell rejecting network slice without providing further information, according to an exemplary implementation of the present disclosure.

FIG. 8 is a diagram illustrating an eLTE eNB/cell rejecting network slice without providing further information, according to an exemplary implementation of the present disclosure. As illustrated in FIG. 8, in action 812, UE 802 sends a network slice/service request through an RRC message, such as an RRC Message for Request (e.g., including UE ID, Slice IDs, NS Indication, and/or Slice Bitmap) to eLTE eNB/cell 804. In action 814, eLTE eNB/cell 804 responds with an RRC Message for Rejection (e.g., Cause: no network slice support). That is, eLTE eNB/cell 804 reads the RRC message from UE 802, and directly responds with an RRC dedicated signaling to reject the network slice support without any further information. In one example, eLTE eNB/cell 804 responds with the RRC dedicated signaling to reject the network slice support because the core network such as an EPC cannot recognize/support the establishment cause of network slice (e.g., Case 500D in FIG. 5D). In another example, eLTE eNB/cell 804 responds with the RRC dedicated signaling to reject the network slice support because the EPC does not support network slice function even though eLTE eNB/cell 804 recognizes the slice IDs and/or NS Indication and/or slice bitmap. In yet another example, eLTE eNB/cell 804 responds with the RRC dedicated signaling to reject the network slice support because eLTE eNB/cell 804 itself cannot support the required/requested network slice/service, and/or eLTE eNB/cell 804 is configured not to perform the network slice inquiry to other nodes/cells (e.g., eLTE eNB s/cells and NR gNBs/cells in MCG and SCG), and/or eLTE eNB/cell 804 attempts to find a suitable eLTE eNB/cell and NR gNB/cell but ends up unsuccessful. It may be also because that UE 802 is not configured with eLTE-NR interworking so that eLTE eNB/cell 804 cannot forward the RRC message to other nodes/cells in MCG or SCG (e.g., eLTE eNB s/cells and NR gNB s/cells) for network slice inquiry. In general, failure cases occur so that eLTE eNB/cell 804 rejects UE 802's request. Once eLTE eNB/cell 804 rejects the network slice support via RRC signaling, the RRC message for rejection (e.g., RRC Message for Rejection) can involve a cause (e.g., no network slice support as shown in FIG. 8) or any of the above mentioned reasons.

In one exemplary implementation, the RRC message for rejection may include a prohibit timer. The prohibit timer may be activated either when eLTE eNB/cell 804 sends the RRC message for rejection or when UE 802 receives the RRC message for rejection. Once the prohibit timer is activated, UE 802 is not allowed to camp to eLTE eNB/cell 804 until the prohibit timer expires. In another exemplary implementation, once the prohibit timer is activated, UE 802 cannot request the same network slice/service from any base station until the prohibit timer expires. The prohibit timer stops either when the prohibit timer expires or when eLTE eNB/cell 804 updates its network slice support (e.g., UE 802 may constantly monitor the network slice support while the prohibit timer is running). Upon receiving the RRC dedicated signaling from eLTE eNB/cell 804 for network slice support rejection, UE 802 may perform the MCG-related procedures (e.g., handover to another master node that supports the required/requested network slice/service, or the inter-MN (master node) handover without the change of the secondary node), or SCG-related procedures (e.g., secondary node change/addition/modification, or beam change/addition/modification, so that the new/target master node or secondary node or beam supports the required/requested network slice/service). In the present application, UE 802 may have multi-connectivity with a number of base stations to support the network slice/service. In the present application, it is noted that UE 802 may record the cell ID that can't support respective network slicing and have corresponding prioritization (e.g., low priority) for cell (re-)selection, handover and the selection of master nodes and secondary nodes.

Case 1B: eLTE eNB/Cell Rejects UE's Request and Provides Further Information.

Figure 9:
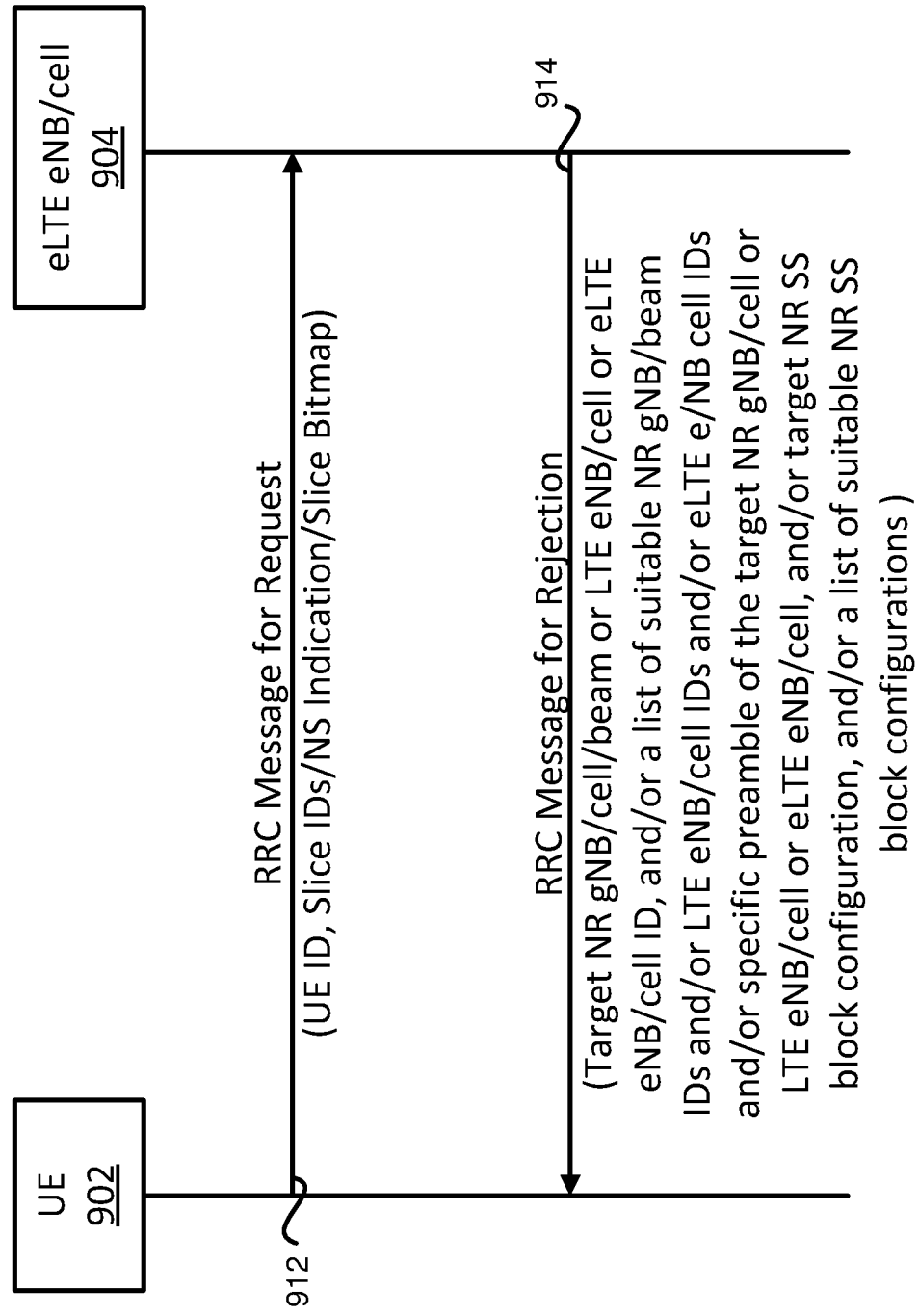
FIG. 9 is a diagram illustrating an eLTE eNB/cell rejecting network slice and providing further information, according to an exemplary implementation of the present disclosure.

FIG. 9 is a diagram illustrating an eLTE eNB/cell rejecting network slice and providing further information, according to an exemplary implementation of the present disclosure. As illustrated in FIG. 9, in action 912, UE 902 sends a network slice/service request through an RRC message, such as an RRC Message for Request (e.g., including UE ID, Slice IDs/NS Indication/Slice Bitmap) to eLTE eNB/cell 904. In action 914, although eLTE eNB/cell 904 rejects the required/requested network slice/service (the cause may be the same in Case 1A), eLTE eNB/cell 904 may provide UE 902 with information of other eLTE eNBs/cells and NR gNBs/cells in the RRC message to assist UE 902 to connect to a suitable NR gNB/cell or eLTE gNB/cell that can provide UE 902's requested network slice/service. For example, eLTE eNB/cell 904 is configured to send network slice inquiries to other nodes/cells or the core network.

According to implementations of the present application, there are two approaches to acquire the information of network slice/service support. The first approach is direct coordination with other eLTE eNB s/cells and NR gNB s/cells. The second approach is to send the inquiry to the core network, such as a 5G-CN.

In the first approach, eLTE eNB/cell 904 sends an Xx/Xn message including UE 902's requested network slice/service information (e.g., Slice IDs/NS Indication/Slice Bitmap) to other eLTE eNB s/cells and NR gNB s/cells. Those eLTE eNB s/cells and NR gNB s/cells, which can support UE 902's requested network slice/service, respond to eLTE eNB/cell 904 with acknowledgement so that eLTE eNB/cell 904 can provide UE 902 with a list of IDs of eLTE eNB s/cells and NR gNB s/cells/beams which can satisfy UE 902's network slice/service request.

In the second approach, the core network (e.g., 5G-CN) may already have stored what types of network slice/service are supported by which eLTE eNBs/cells and NR gNBs/cells. Therefore, eLTE eNB/cell 904 may send NG-C signaling to the core network including UE 902's requested network slice/service. The core network may retrieve the information of suitable eLTE eNBs/cells and NR gNBs/cells, and provide a list of suitable eLTE eNB/cell and NR gNB/cell IDs to eLTE eNB/cell 904 through NG-C signaling. eLTE eNB/cell 904 may either first filter the list (e.g., remove the blocked cells) before transmitting it to UE 902, or directly transmit the list to UE 902 without any modification.

After eLTE eNB/cell 904 acquires the information regarding which eLTE eNB s/cells and NR gNBs/cells support UE 902's network slice/service request, eLTE eNB/cell 904 may respond to UE 902 with an RRC message (e.g., RRC Connection Reject or RRC Connection Reconfiguration), where the RRC message includes information such as target NR gNB/cell/beam or LTE eNB/cell or eLTE eNB/cell ID, and/or a list of suitable NR gNB/cell/beam IDs and/or LTE eNB/cell IDs and/or eLTE eNB/cell IDs, and/or specific preamble of the target NR gNB/cell or LTE eNB/cell or eLTE eNB/cell, and/or target NR SS (Synchronization Signal) block/burst/burst set configuration, and/or a list of suitable NR SS block/burst/burst set configurations, as illustrated in FIG. 9. The SS block/burst/burst set may include synchronization signals and/or reference signals for UE 902 to do measurements. Thus, UE 902 may perform measurements to the target NR gNB/cell/beam or LTE eNB/cell or eLTE eNB/cell or a list of NR gNBs/cells/beams or LTE eNBs/cells or eLTE eNBs/cells. Moreover, with the information of preamble, the target node/cell may regard UE 902 as a special UE, and provide UE 902 with privilege during the random access procedure. Providing the beam information and the SS block/burst/burst set configurations to UE 902 may be beneficial, when different beams can support different network slices/services (different numerology/TTI length configurations) in NR.

In other implementations, eLTE eNB/cell 904 may directly select a target NR gNB/cell/beam or a target LTE eNB/cell or a target eLTE eNB/cell for UE 902, and send an RRC message (e.g., RRC Connection Reject or RRC Connection Reconfiguration) including the cell ID, and/or preamble, and/or beam ID (if supported), and/or SS block/burst/burst set configuration (if supported) of target NR gNB/cell or a target LTE eNB/cell or a target eLTE eNB/cell to UE 902. UE 902 may perform the handover to another master node which supports the required/requested network slice/service, or the inter-MN handover without the change of the secondary node, or secondary node change/addition/modification so that the new/target secondary node supports the required/requested network slice/service. In the present implementation, UE 902 may have multi-connectivity with a number of base stations to support the network slice/service. It is noted that the NR gNBs/cells and eLTE eNBs/cells chosen by eLTE eNB/cell 904 may at least provide the network slice function, and optionally provide UE 902's specific requested network slice/service.

In other implementations, the RRC message for rejection may include a prohibit timer. The prohibit timer may be activated either when eLTE eNB/cell 904 sends the RRC message for rejection or when UE 902 receives this RRC message for rejection. Once the prohibit timer is activated, UE 902 may not be allowed to camp to eLTE eNB/cell 904 until the prohibit timer expires. In another implementation, once the prohibit timer is activated, UE 902 cannot request the same network slice/service from any base station until the prohibit timer expires. The prohibit timer stops either when the timer expires or when eLTE eNB/cell 904 updates its network slice support (e.g., UE 902 may constantly monitor slice support while the prohibit timer is running).

Case 1C: eLTE eNB/Cell Accepts UE's Request with RRC Message.

An eLTE eNB/cell reads the RRC message including a UE's network slice/service request, and decides to provide such network slice/service on its own.

Figure 10:
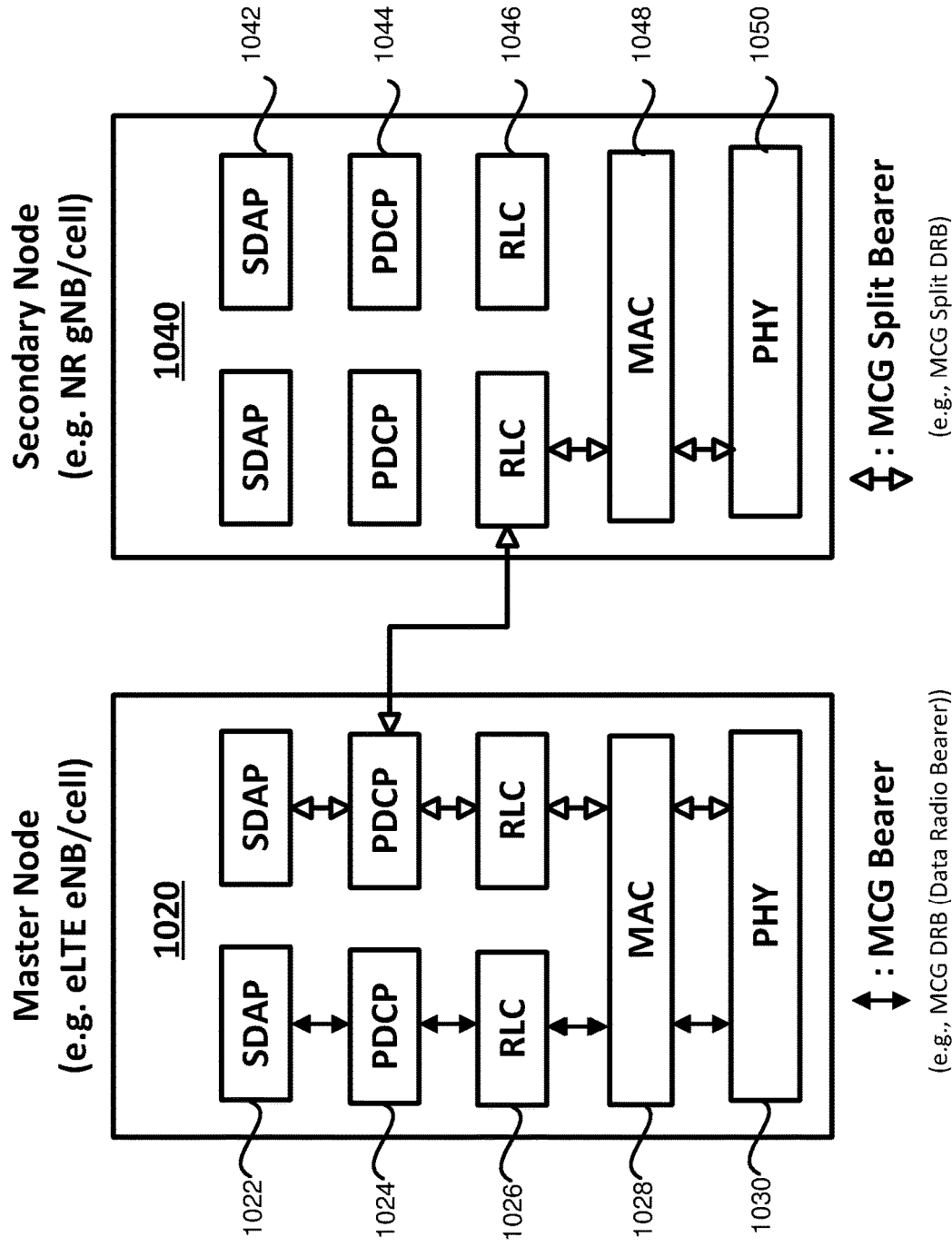
FIG. 10 is a diagram illustrating an MCG bearer and an MCG split bearer with an eLTE eNB/cell as a master node, according to an exemplary implementation of the present disclosure.

FIG. 10 is a diagram illustrating an MCG bearer and an MCG split bearer (e.g., a split bearer) with an eLTE eNB/cell as a master node, according to an exemplary implementation of the present disclosure. When eLTE eNB/cell 1020 is a master node, the network slice may be provided through an MCG split bearer and/or an MCG bearer, as shown in FIG. 10. For example, eLTE eNB/cell 1020 may reply to the UE with an RRC message (e.g., RRC Connection Setup or RRC Reconfiguration) through an MCG SRB or an MCG split SRB, indicating the related parameters to build the MCG split bearer.

As shown in FIG. 10, eLTE eNB/cell 1020 may be a master node in an MCG, and may include SDAP layer 1022, PDCP layer 1024, RLC layer 1026, MAC layer 1028, and PHY layer 1030. NR gNB/cell 1040 may be a secondary node in the SCG, and may include SDAP layer 1042, PDCP layer 1044, RLC layer 1046, MAC layer 1048, and PHY layer 1050. The network slice may be provided through an MCG bearer via SDAP layer 1022, PDCP layer 1024, RLC layer 1026, MAC layer 1028, and PHY layer 1030 of eLTE eNB/cell 1020. Instead of, or in addition to, the network slice being provided through the MCG bearer, the network slice may be provided through an MCG split bearer via SDAP layer 1022, PDCP layer 1024 of eLTE eNB/cell 1020, and via RLC layer 1046, MAC layer 1048, and PHY layer 1050 of NR gNB/cell 1040 (e.g., a secondary node). In some implementations, NR gNB/cell 1040 is a selected NR gNB/cell that supports the RAN part of slicing. In some implementations, the selected NR gNB/cell may utilize an existing secondary cell in an SCG or add a new secondary cell to the SCG. Thus, SCG-related procedures may be utilized to realize the MCG split bearer.

Figure 11:
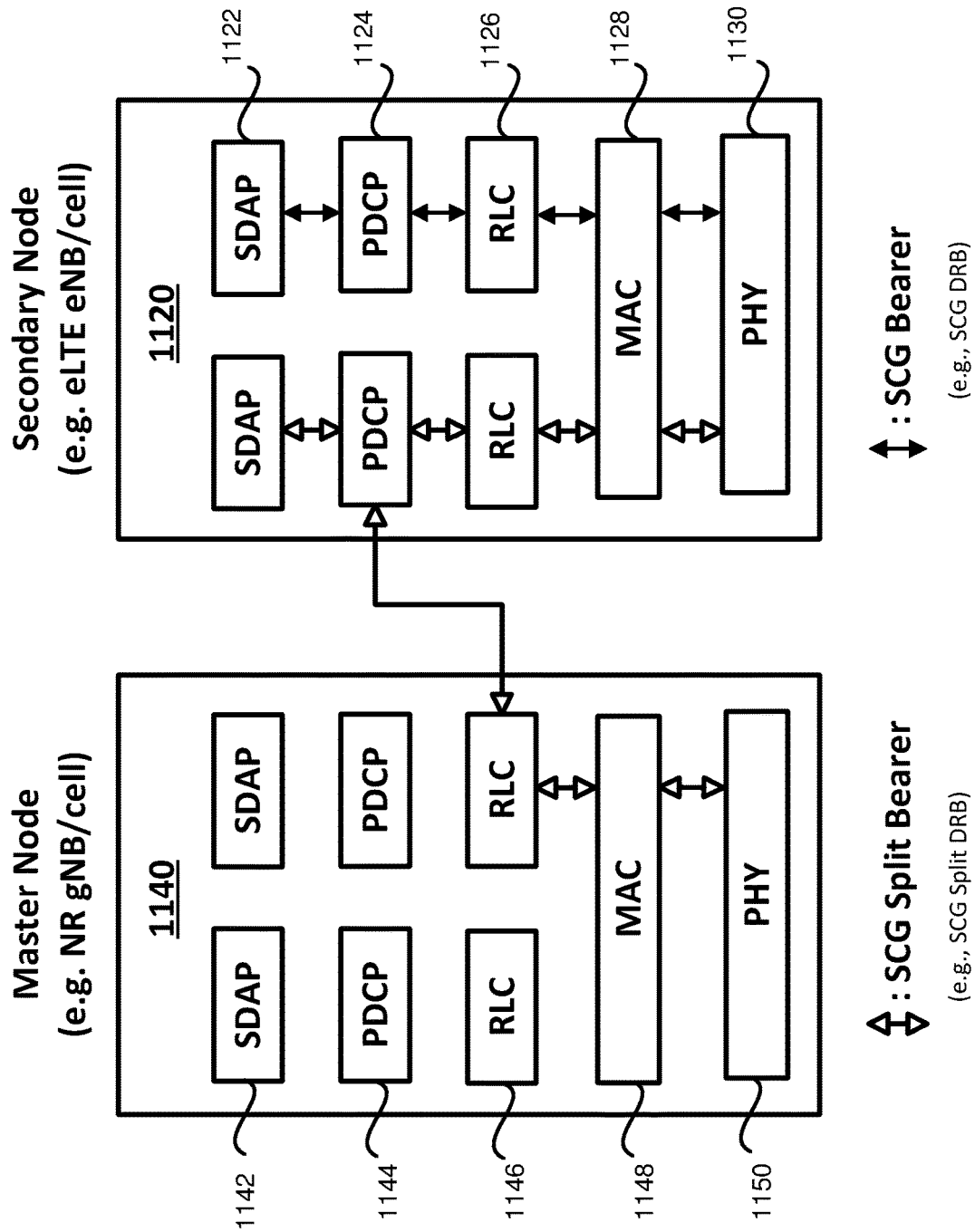
FIG. 11 is a diagram illustrating an SCG bearer and an SCG split bearer with an eLTE eNB/cell as a secondary node, according to an exemplary implementation of the present disclosure.

FIG. 11 is a diagram illustrating an SCG bearer and an SCG split bearer (e.g., a split bearer) with an eLTE eNB/cell as a secondary node, according to an exemplary implementation of the present disclosure. When eLTE eNB/cell 1120 is a secondary node, the network slice may be provided through an SCG split bearer and/or an SCG bearer, as shown in FIG. 11. For example, eLTE eNB/cell 1120 may reply to the UE with an RRC message (e.g., RRC Connection Setup or RRC Reconfiguration) through an SCG SRB and/or an SCG split SRB, indicating the related parameters to build the SCG split bearer.

As shown in FIG. 11, eLTE eNB/cell 1120 may be a secondary node in an SCG, and may include SDAP layer 1122, PDCP layer 1124, RLC layer 1126, MAC layer 1128, and PHY layer 1130. NR gNB/cell 1040 may be a secondary node in the MCG, and may include SDAP layer 1142, PDCP layer 1144, RLC layer 1146, MAC layer 1148, and PHY layer 1150. The network slice may be provided through an SCG bearer via SDAP layer 1122, PDCP layer 1124, RLC layer 1126, MAC layer 1128, and PHY layer 1130 of eLTE eNB/cell 1120. Instead of, or in addition to, the network slice being provided through the SCG bearer, the network slice may be provided through an SCG split bearer via SDAP layer 1122, PDCP layer 1124 of eLTE eNB/cell 1120, and via RLC layer 1146, MAC layer 1148, and PHY layer 1150 of NR gNB/cell 1140 (e.g., a master node). In some implementations, NR gNB/cell 1140 is a selected NR gNB/cell that supports the RAN part of slicing. In some implementations, the selected NR gNB/cell may utilize an existing master cell in an MCG or add a new master cell to the MCG. Thus, MCG-related procedures may be utilized to realize the SCG split bearer.

Figure 12A:
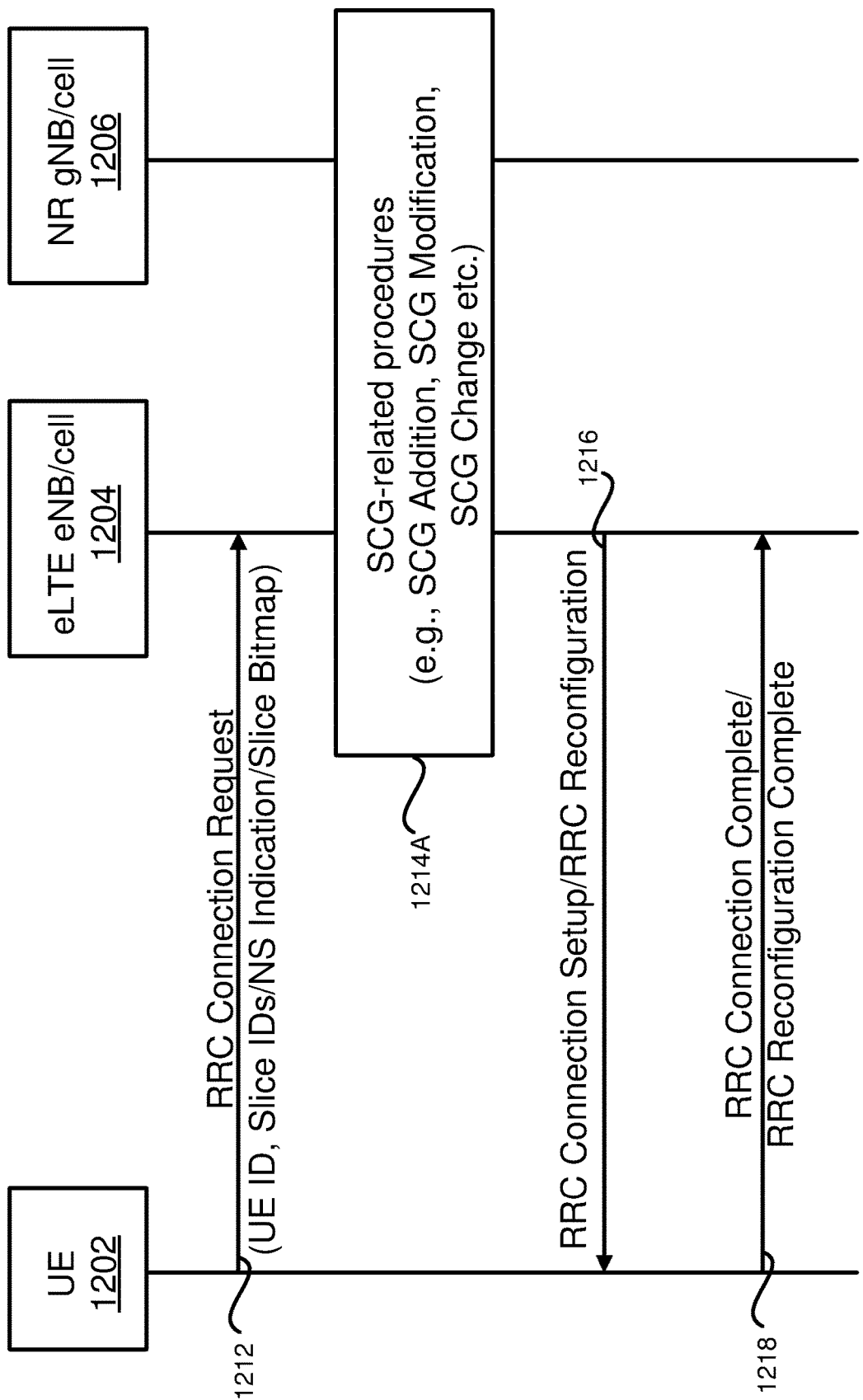
FIG. 12A is a diagram illustrating an eLTE eNB/cell, as a master node, accepting network slice inquiry, according to an exemplary implementation of the present disclosure.
Figure 12B:
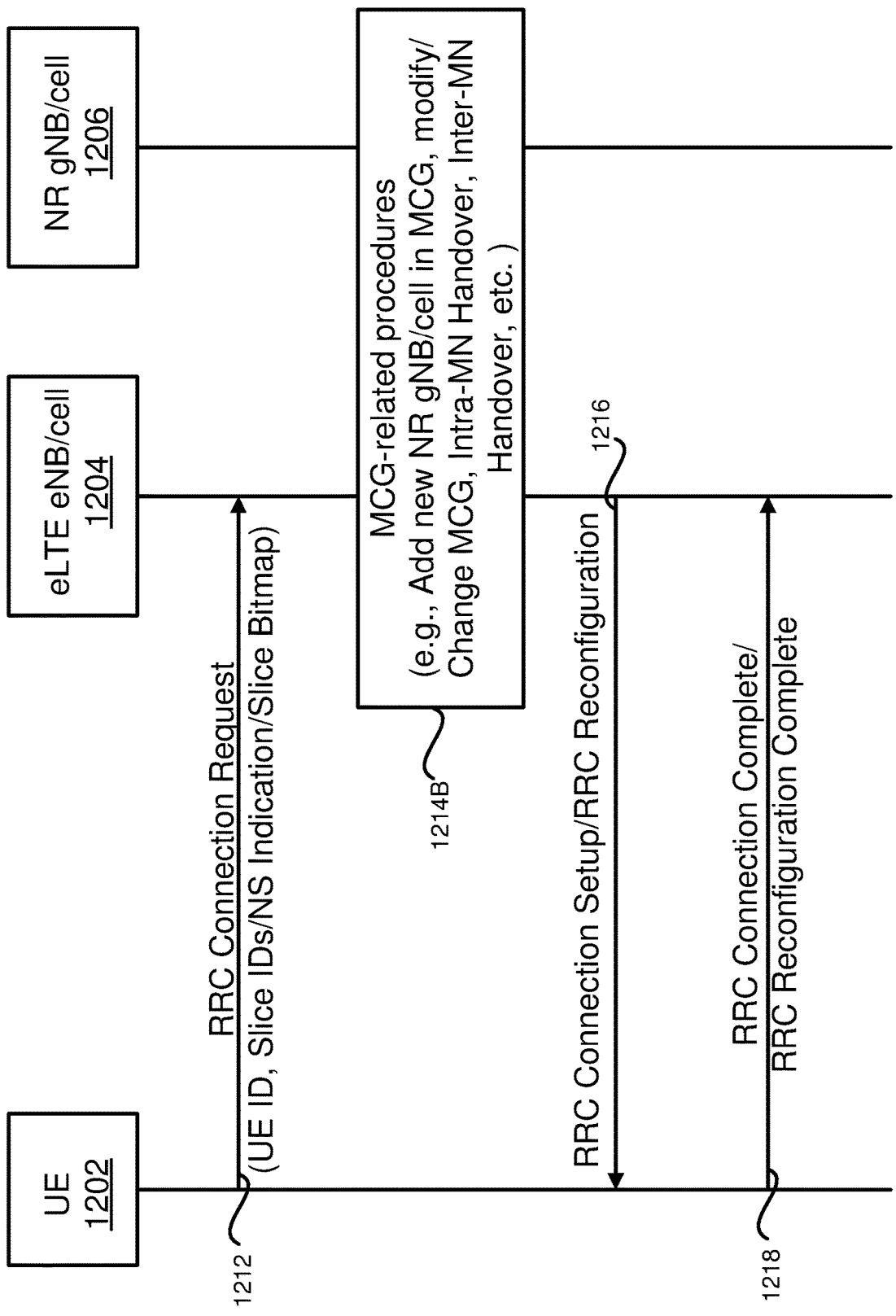
FIG. 12B is a diagram illustrating an eLTE eNB/cell, as a secondary node, accepting network slice inquiry, according to an exemplary implementation of the present disclosure.

It is noted that SCG-related procedures 1214A in FIG. 12A, and MCG-related procedures 1214B in FIG. 12B, may include beam-level operations, such as beam addition (e.g., add NR beams that support the required/requested network slice), beam change (e.g., change from the serving NR beam to a new beam that support the required/requested network slice), and beam modification (e.g., modify a beam so that the beam supports the required/requested network slice).

After SCG-related procedures 1214A in FIG. 12A, and MCG-related procedures 1214B in FIG. 12B, eLTE eNB/cell 1204 informs UE 1202 using an RRC message (e.g., RRC Connection Setup, RRC Configuration, or RRC Reconfiguration). After SCG-related procedures 1214A in FIG. 12A, and MCG-related procedures 1214B in FIG. 12B, eLTE eNB/cell 1204 has established connection to NR gNB/cell 1206 for the RAN part of slicing. The control signaling exchange for the SCG-related or MCG-related procedures occurs in an Xx/Xn interface. The exchanged information may include UE ID, Slice IDs, Slice Bitmap, NS Indication, target NR gNB/cell/beam, LTE eNB/cell or eLTE eNB/cell ID, a list of suitable NR gNB/cell/beam IDs and/or LTE eNB/cell IDs and/or eLTE eNB/cell IDs, and/or specific preamble of the target NR gNB/cell or LTE eNB/cell or eLTE eNB/cell, and/or target NR SS block/burst/burst set configuration, and/or a list of suitable NR SS block/burst/burst set configurations.

After receiving the RRC message (e.g., RRC Connection Setup, RRC Configuration, or RRC Reconfiguration) from eLTE eNB/cell 1204, UE 1202 sends an RRC message in action 1218, (e.g., an RRC Connection Setup Complete, an RRC Configuration Complete, or an RRC Connection Reconfiguration Complete) to eLTE eNB/cell 1204 through an MCG SRB or an MCG split SRB if eLTE eNB/cell 1204 is a master node in an MCG, or through an SCG SRB or an SCG split SRB if eLTE eNB/cell 1204 is a secondary node in an SCG.

Case 2: UE Reveals its Network Slice Capability to NR gNB/Cell.

A UE may reveal its network slice capability and/or requirement to an NR gNB/cell through an RRC message. The NR gNB/cell may be a master node in a Master Cell Group (MCG) as shown in FIG. 5C, or a secondary node in a Secondary Cell Group (SCG) as shown in FIGS. 5B and 5D.

Figure 13:
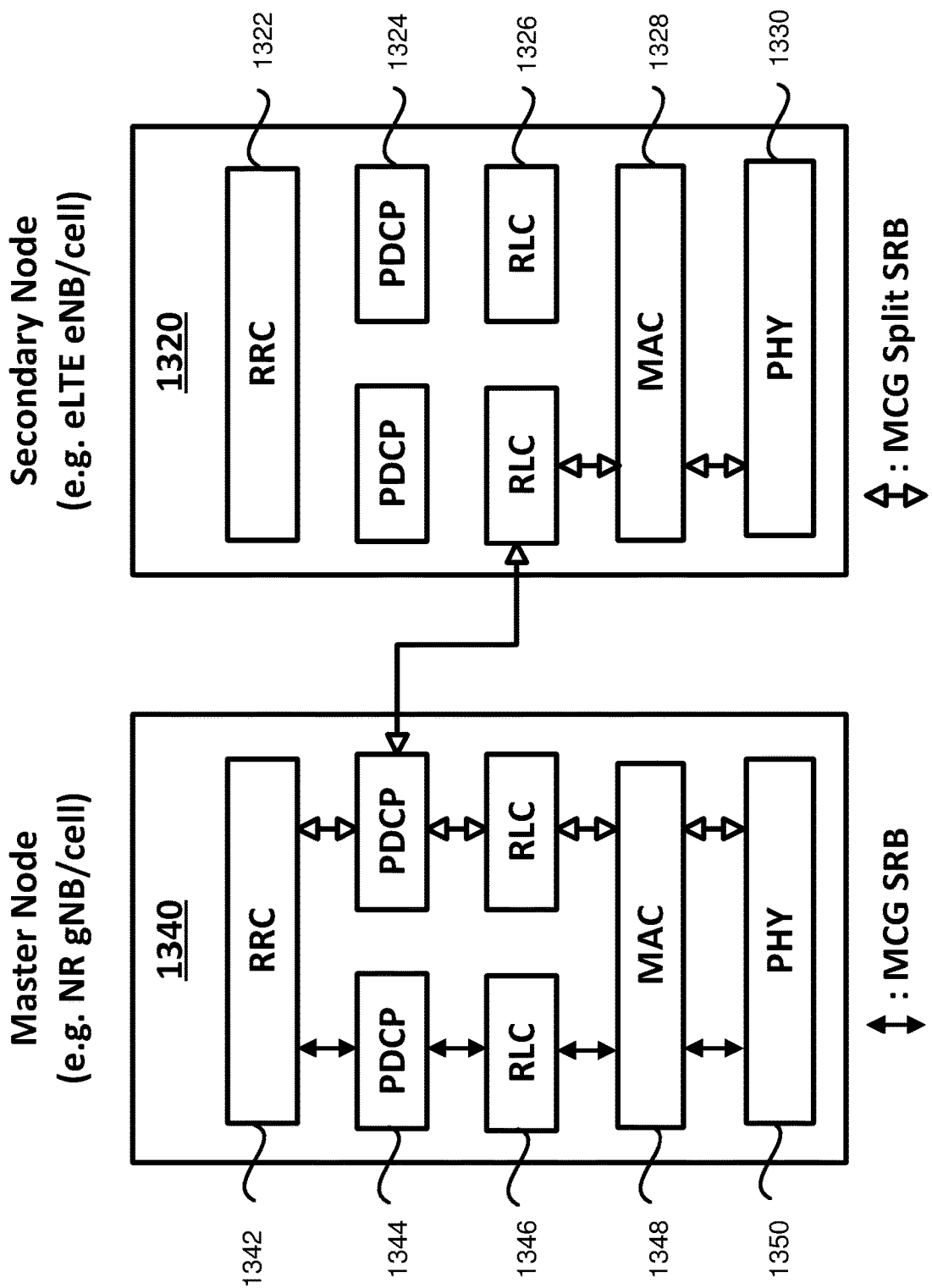
FIG. 13 is a diagram illustrating an MCG SRB and an MCG split SRB with an NR gNB/cell as a master node, according to an exemplary implementation of the present disclosure.

FIG. 13 is a diagram illustrating an MCG SRB and an MCG split SRB with an NR gNB/cell as a master node, according to an exemplary implementation of the present disclosure. As shown in FIG. 13, when NR gNB/cell 1340 is a master node, the control signaling revealing a UE's network slice capability (e.g., an RRC message), between the UE and NR gNB/cell 1340, may be provided through one or more MCG SRBs and/or one or more MCG split SRBs. As shown in FIG. 13, NR gNB/cell 1340 may be a master node in an MCG, and may include RRC layer 1342, PDCP layer 1344, RLC layer 1346, MAC layer 1348, and PHY layer 1350. eLTE eNB/cell 1320 may be a secondary node in an SCG, and may include RRC layer 1322, PDCP layer 1324, RLC layer 1326, MAC layer 1328, and PHY layer 1330. The control signaling revealing the UE's network slice capability, between UE and NR gNB/cell 1340, may be provided through an MCG SRB via RRC layer 1342, PDCP layer 1344, RLC layer 1346, MAC layer 1348, and PHY layer 1350 of NR gNB/cell 1340. Instead of, or in addition to, the control signaling being provided through the MCG SRB, the control signaling revealing the UE's network slice capability, between the UE and NR gNB/cell 1340, may be provided through an MCG split SRB, via RRC layer 1342 and PDCP layer 1344 of NR gNB/cell 1340, and via RLC layer 1326, MAC layer 1328, and PHY layer 1330 of eLTE eNB/cell 1320 (e.g., a secondary node in an SCG).

Figure 14:
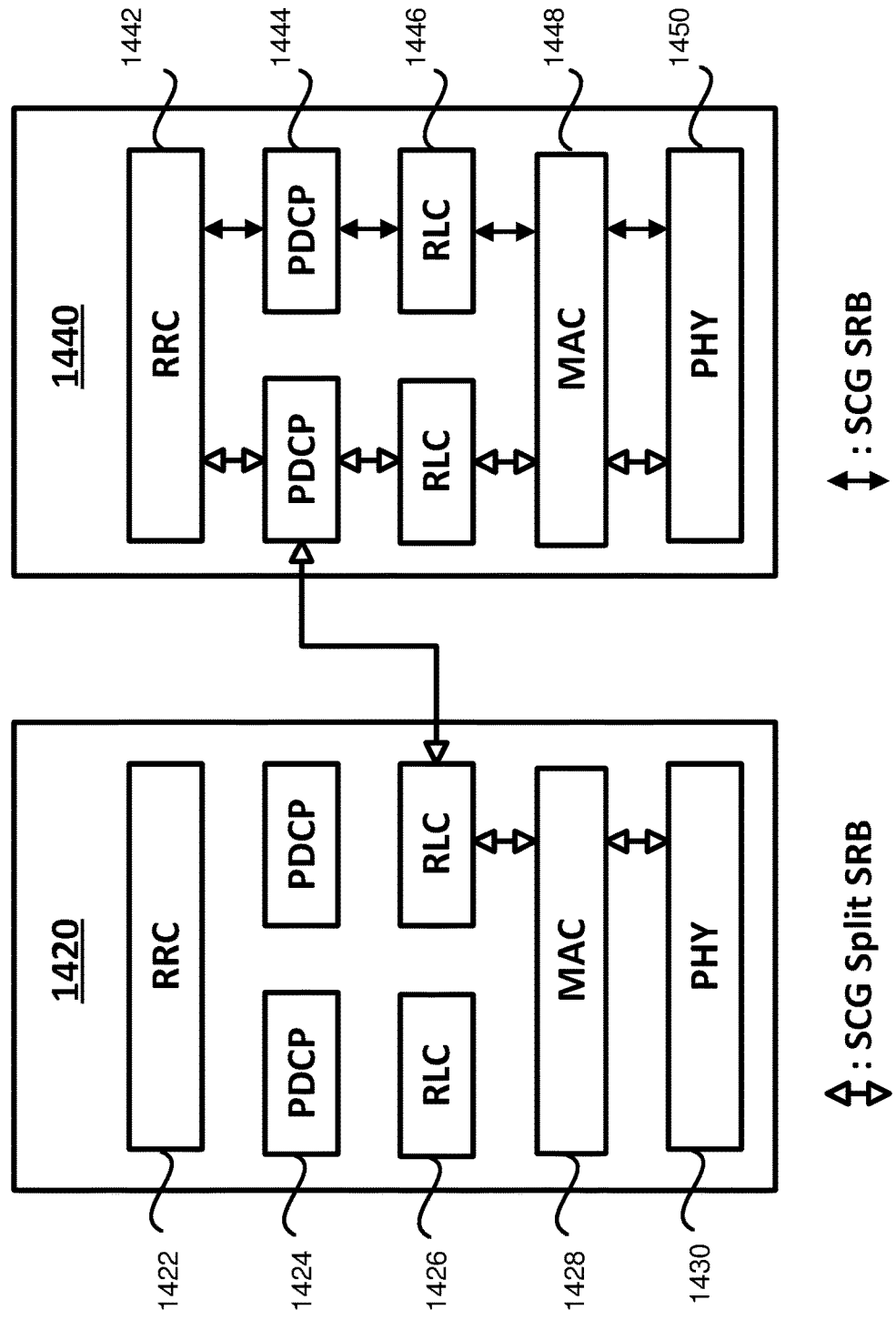
FIG. 14 is a diagram illustrating an SCG SRB and an SCG split SRB with an NR gNB/cell as a secondary node, according to an exemplary implementation of the present disclosure.

FIG. 14 is a diagram illustrating an SCG SRB and an SCG split SRB with an NR gNB/cell as a secondary node, according to an exemplary implementation of the present disclosure. It is noted that SCG SRB may also be regarded as SRB3. As shown in FIG. 14, when NR gNB/cell 1440 is a secondary node, the control signaling revealing a UE's network slice capability, between the UE and NR gNB/cell 1440, may be provided through one or more SCG SRBs and/or one or more SCG split SRBs. As shown in FIG. 14, eLTE eNB/cell 1420 may be a master node in an MCG, and may include RRC layer 1422, PDCP layer 1424, RLC layer 1426, MAC layer 1428, and PHY layer 1430. NR gNB/cell 1440 may be a secondary node in an SCG, and may include RRC layer 1442, PDCP layer 1444, RLC layer 1446, MAC layer 1448, and PHY layer 1450. The control signaling revealing the UE's network slice capability, between the UE and NR gNB/cell 1440, may be provided through an SCG SRB via RRC layer 1442, PDCP layer 1444, RLC layer 1446, MAC layer 1448, and PHY layer 1450 of NR gNB/cell 1440.

Instead of, or in addition to, the control signaling being provided through the SCG SRB, the control signaling revealing the UE's network slice capability, between the UE and NR gNB/cell 1440, may be provided through an SCG split SRB, via RRC layer 1442 and PDCP layer 1444 of NR gNB/cell 1440, and via RLC layer 1426, MAC layer 1428, and PHY layer 1430 of eLTE eNB/cell 1420 (e.g., a master node in an MCG). In some implementations, the control signaling (e.g., RRC messages) between the secondary node NR gNB/cell 1440 (e.g., a secondary node in an SCG) and the UE may be transmitted via the embedded approach described herein.

Figure 15:
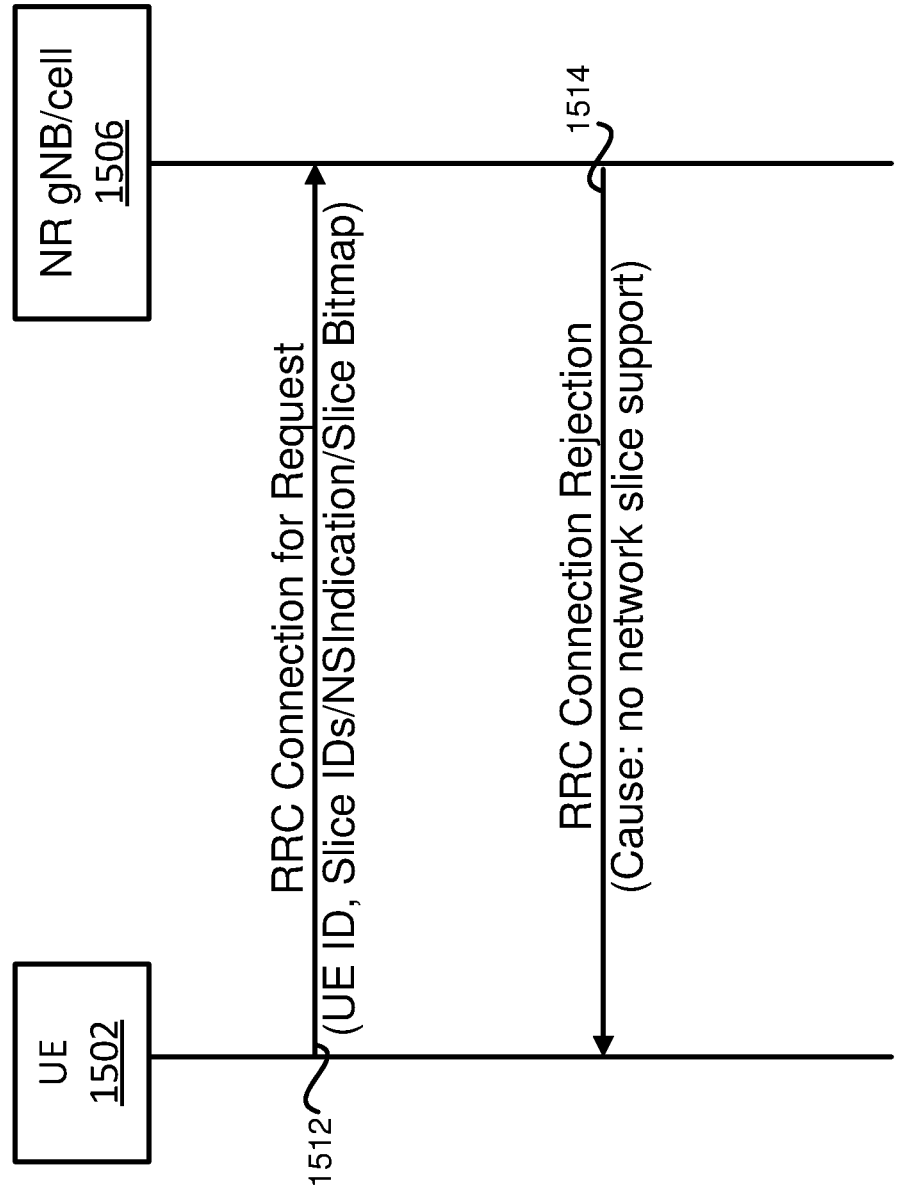
FIG. 15 is a diagram illustrating an NR gNB/cell rejecting network slice without providing further information, according to an exemplary implementation of the present disclosure.
Figure 16:
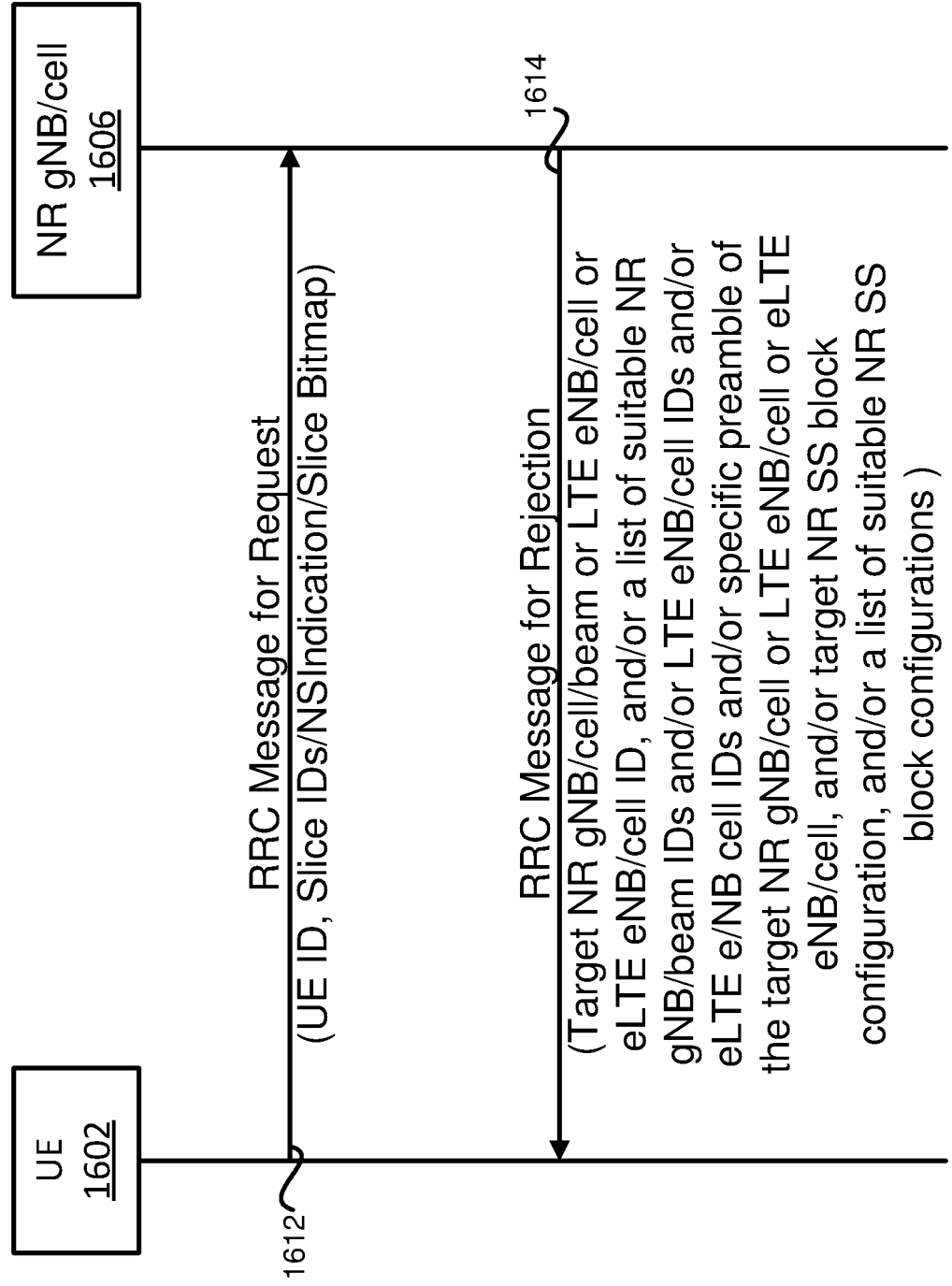
FIG. 16 is a diagram illustrating an NR gNB/cell rejecting network slice and providing further information, according to an exemplary implementation of the present disclosure.
Figure 17:
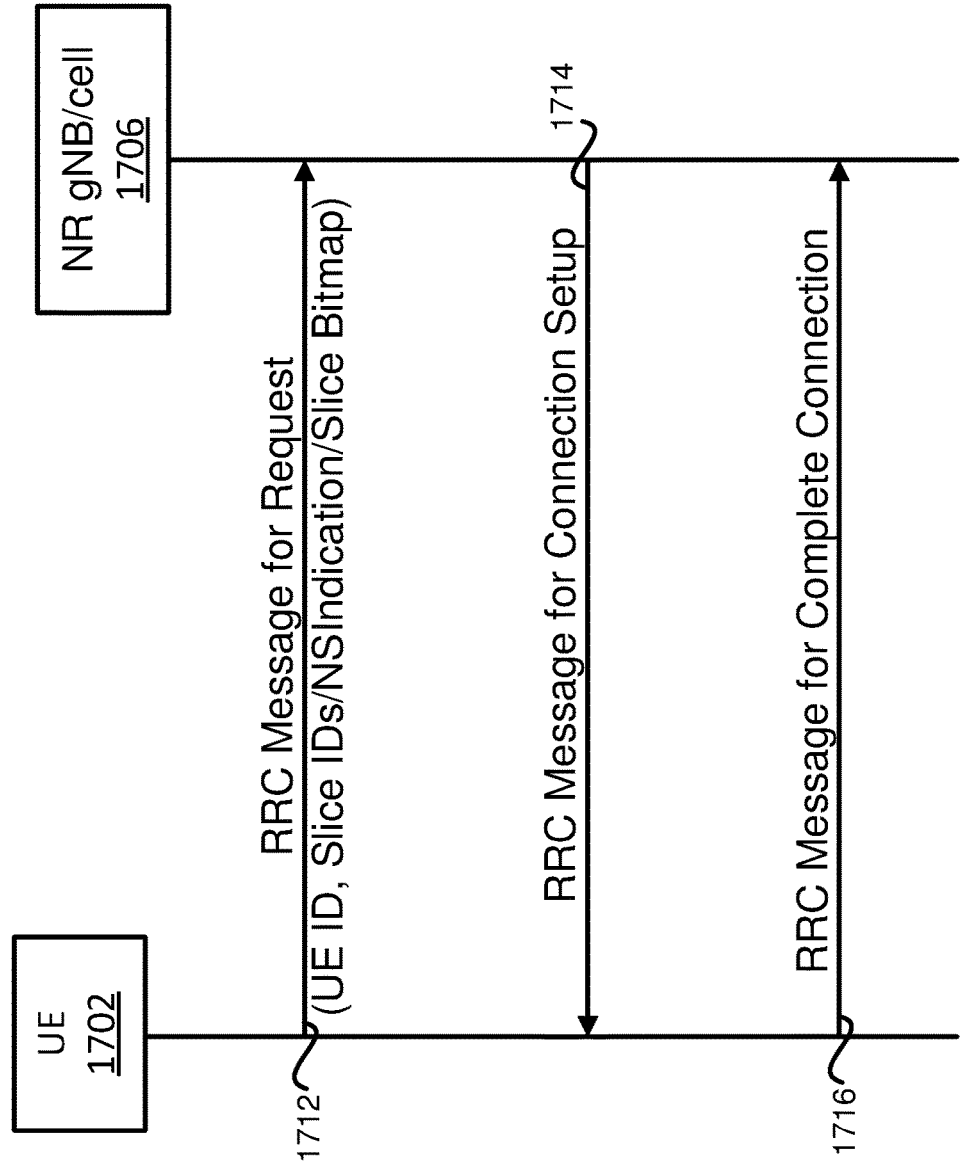
FIG. 17 is a diagram illustrating an NR gNB/cell accepting network slice inquiry, according to an exemplary implementation of the present disclosure.

In accordance with implementations as illustrated in FIGS. 15, 16, and 17 of the present disclosure, a UE may reveal its network slice capability and/or service requirement in an RRC message (e.g., an RRC Connection Request or RRC Connection Setup Complete or an RRC Connection Establishment). The RRC message may include a UE ID to reveal the UE identity. The RRC message may include slice IDs and/or network slice type ID (NS-ID) to directly identify the type of network slice and/or required/requested service. In another exemplary implementation, a slice bitmap may be used to directly identify the type of network slice and/or required/requested service in the RRC message. For example, the slice bitmap may include preconfigured N bits (e.g., N supported network slices/services), with a bit "1" meaning the corresponding network slice/service is supported, and a bit "0" meaning the corresponding network slice/service is not supported.

It should be noted that, in the present application, slice IDs in the figures are merely used for illustration purposes. That is, the slice IDs may be replaced with slice bitmaps to identify the indicated network slice(s)/service(s). The cause value in an RRC message may be "network slice" corresponding to a NAS procedure. Moreover, the RRC message may carry the network slice indication (NS Indication), to indicate the network slice requirement instead of explicitly revealing the slice service type.

The RRC entity of the NR gNB/cell may recognize whether the required/requested service or the required/requested network slice function is supported. It is noted that the RRC entity of the NR gNB/cell is preconfigured for RAN part of slicing (e.g., multiple numerologies/TTI lengths for different slices) so that the NR gNB/cell can identify whether it supports the UE's service request or not.

In exemplary implementations of the present application, the NR gNB/cell, after receiving the RRC message, may take the following actions: Case 2A—reject through an RRC message without providing any further information; Case 2B—reject through an RRC message and provide assisting information in the RRC message; Case 2C—accept through an RRC message. It should be noted that the RRC message exchange between the UE and the NR gNB is not limited to the NR gNB as a master node or a secondary node under dual-connectivity operation. For example, the RRC message exchange between the UE and the NR gNB may also be applicable when the NR gNB is a standalone node.

Case 2A: NR gNB/Cell Rejects UE's Request without Providing Further Information.

FIG. 15 is a diagram illustrating an NR gNB/cell rejecting network slice without providing further information, according to an exemplary implementation of the present disclosure. As illustrated in FIG. 15, in action 1512, UE 1502 sends a network slice/service request through an RRC message, such as an RRC Connection Request or RRC Connection Setup Complete (e.g., including UE ID, Slice IDs, NS Indication, and/or Slice Bitmap) to NR gNB/cell 1506. In action 1514, NR gNB/cell 1506 responds with an RRC Connection Reject (e.g., Cause: no network slice support). That is, NR gNB/cell 1506 reads the RRC message from UE 1502, and directly responds with an RRC dedicated signaling to reject the network slice support without providing any further information. In one example, NR gNB/cell 1506 responds with the RRC dedicated signaling to reject the network slice support because the NR gNB/cell and/or eLTE eNB/cell cannot support the required/requested network slice/service. In another example, NR gNB/cell 1506 responds with the RRC dedicated signaling to reject the network slice support because the NR gNB/cell refuses to support the required/requested network slice/service (e.g., due to no available network resource) even though it can. In yet another example, NR gNB/cell 1506 responds with the RRC dedicated signaling to reject the network slice support because some failure cases occur in the network. After NR gNB/cell 1506 rejects UE 1502's request via the RRC message, the RRC message for rejection can involve a cause (e.g., no network slice support as shown in FIG. 15) or any of the above mentioned reasons.

In one exemplary implementation, the RRC message for rejection may include a prohibit timer. The prohibit timer may be activated either when NR gNB/cell 1506 sends the RRC message for rejection or when UE 1502 receives the RRC message for rejection. Once the prohibit timer is activated, UE 1502 is not allowed to camp to NR gNB/cell 1506 until the prohibit timer expires. In another exemplary implementation, once the prohibit timer is activated, UE 1502 cannot request the same network slice/service from any base station until the prohibit timer expires. The prohibit timer stops either when the prohibit timer expires or when the NR gNB/cell 1506 updates its network slice support (e.g., UE 1502 may constantly monitor the network slice support while the prohibit timer is running) Upon receiving the RRC dedicated signaling from NR gNB/cell 1506 for network slice support rejection, UE 1502 may perform the MCG-related procedures (e.g., handover to another master node that supports the required/requested network slice/service, or the inter-MN (master node) handover without the change of the secondary node), or SCG-related procedures (e.g., secondary node change/addition/modification, or beam change/addition/modification, so that the new/target master node or secondary node or beam supports the required/requested network slice/service). In the present application, UE 1502 may have multi-connectivity with a number of base stations to support the network slice/service. In the present application, it is noted that UE 1502 may record the cell ID that cannot support respective network slicing and have corresponding prioritization (e.g., low priority) for cell (re-)selection, handover and the selection of master nodes and secondary nodes.

Case 2B: NR gNB/Cell Rejects UE's Request and Provides Further Information.

FIG. 16 is a diagram illustrating an NR gNB/cell rejecting network slice and providing further information, according to an exemplary implementation of the present disclosure. As illustrated in FIG. 16, in action 1612, UE 1602 sends a network slice/service request through an RRC message, such as an RRC Message for Request (e.g., including UE ID, Slice IDs/NS Indication/Slice Bitmap) to NR gNB/cell 1606.

In action 1614, NR gNB/cell 1606 cannot establish an RRC connection for UE 1602's network slice/service requirement (the cause may be the same in Case 2A), and NR gNB/cell 1606 replies with an RRC message (e.g., RRC Message for Rejection or RRC Connection Reject). Nevertheless, NR gNB/cell 1606 may provide further information of other NR gNBs/cells and eLTE eNB s/cells in the RRC message to assist UE 1602 to connect to a suitable NR gNB/cell or eLTE gNB/cell that can provide UE 1602's required/requested network slice/service. NR gNB/cell 1606 is configured to send network slice inquiries to other nodes/cells or the core network.

According to implementations of the present application, there are two approaches to acquire the information of network slice/service support. The first approach is direct coordination with other eLTE eNBs/cells and NR gNBs/cells. The second approach is to send the inquiry to the core network, such as a 5G-CN.

In the first approach, NR gNB/cell 1606 sends the Xx/Xn message including UE 1602's request network slice/service information (e.g., Slice IDs, NS Indication, or Slice Bitmap) to other eLTE eNB s/cells and NR gNB s/cells. Those eLTE eNB s/cells and NR gNB s/cells, which support UE 1602's request network slice/service, respond to NR gNB/cell 1606 with acknowledgement so that NR gNB/cell 1606 can provide UE 1602 with a list of IDs of eLTE eNBs/cells and NR gNBs/cells/beams which can satisfy UE 1602's network slice/service request.

In the second approach, the core network (e.g., 5G-CN) may already have stored what types of network slice/service are supported by which eLTE eNBs/cells and NR gNBs/cells. Therefore, NR gNB/cell 1606 may send NG-C signaling to the core network including UE 1602's request network slice/service. The core network may retrieve the information of suitable eLTE eNB s/cells and NR gNB s/cells, and provide the list of suitable eLTE eNB/cell and NR gNB/cell IDs to NR gNB/cell 1606 through NG-C signaling. NR gNB/cell 1606 may either filter the list (e.g., remove the blocked cells) before transmitting it to UE 1602, or directly transmit the list to UE 1602 without any modification.

After NR gNB/cell 1606 acquires the information regarding which NR gNB s/cells and eLTE eNB s/cells support UE 1602's network slice/service request, NR gNB/cell 1606 may respond to UE 1602 with RRC message (e.g., RRC Connection Reject or RRC Connection Reconfiguration), where the RRC message includes information such as target NR gNB/cell/beam or LTE eNB/cell or eLTE eNB/cell ID, and/or a list of suitable NR gNB/cell/beam IDs and/or LTE eNB/cell IDs and/or eLTE eNB/cell IDs, and/or specific preamble of the target NR gNB/cell or LTE eNB/cell or eLTE eNB/cell, and/or target NR SS block/burst/burst set configuration, and/or a list of suitable NR SS block/burst/burst set configurations, as illustrated in FIG. 16. The SS block/burst/burst set may include synchronization signals and/or reference signals for UE 1602 to do measurements. Thus, UE 1602 may perform measurements to the target NR gNB/cell/beam or LTE eNB/cell or eLTE eNB/cell or a list of NR gNB s/cells/beams or LTE eNBs/cells or eLTE eNBs/cells. Moreover, with the information of preamble, the target node/cell may regard UE 1602 as a special UE, and provide UE 1602 with privilege during the random access procedure. Providing the beam information and the SS block/burst/burst set configurations to UE 1602 may be beneficial, when different beams can support different network slices/services (different numerology/TTI length configurations) in NR.

In other implementations, NR gNB/cell 1606 may directly select a target NR gNB/cell or a target LTE eNB/cell or a target eLTE eNB/cell for UE 1602, and send an RRC message (e.g., RRC Connection Reject or RRC Connection Reconfiguration) including the cell ID, and/or preamble, and/or beam ID (if supported), and/or SS block/burst/burst set configuration (if supported) of a target NR gNB/cell or a target LTE eNB/cell or a target eLTE eNB/cell to UE 1602. UE 1602 may perform MCG-related/SCG-related procedures (e.g., handover to another master node that supports the required/requested network slice/service, the inter-MN handover without the change of the secondary node, beam change/addition/modification, or secondary node change/addition/modification so that the new/target secondary node supports the required/requested network slice/service) for slice-driven mobility management. In the present implementation, UE 1602 may have multi-connectivity with a number of base stations to support the network slice/service. It is noted that the NR gNB s/cells and eLTE eNBs/cells chosen by NR gNB/cell 1606 may at least provide the network slice function, and optionally provide UE 1602's specific request network slice/service.

In other implementations, the RRC message for rejection may include a prohibit timer. The prohibit timer may be activated either when NR gNB/cell 1606 sends the RRC message for rejection or when UE 1602 receives the RRC message for rejection. Once the prohibit timer is activated, UE 1602 may not be allowed to camp to NR gNB/cell 1606 until the prohibit timer expires. In other implementations, once the prohibit timer is activated, UE 1602 cannot request the same network slice/service from any base station until the prohibit timer expires. The prohibit timer stops either when the prohibit timer expires or when NR gNB/cell 1606 updates its network slice support (e.g., UE 1602 may constantly monitor the network slice support while the prohibit timer is running).

Case 2C: NR gNB/Cell Accepts UE's Request with RRC Message.

FIG. 17 is a diagram illustrating an NR gNB/cell accepting network slice inquiry, according to an exemplary implementation of the present disclosure. As illustrated in FIG. 17, in action 1712, UE 1702 sends a network slice/service request through an RRC message, such as an RRC Message for Request (e.g., including UE ID, Slice IDs/NS Indication/Slice Bitmap) to NR gNB/cell 1706. In action 1714, NR gNB/cell 1706 reads the RRC message including UE 1702's network slice/service request, and decides to provide such network slice/service on its own. NR gNB/cell 1706 may reply to UE 1702 with an RRC message, such as an RRC Message for Connection Setup (e.g., RRC Connection Setup or RRC Reconfiguration) to build a connection or reconfigure the connection for the required/requested network slice/service between UE 1702 and NR gNB/cell 1706, as shown in FIG. 17. Upon receiving the RRC message, UE 1702 responds with another RRC message, such as an RRC Message for Complete Connection (e.g., RRC Connection Setup Complete or RRC Reconfiguration Complete) to show its acknowledgement as shown in FIG. 17.

Figure 18:
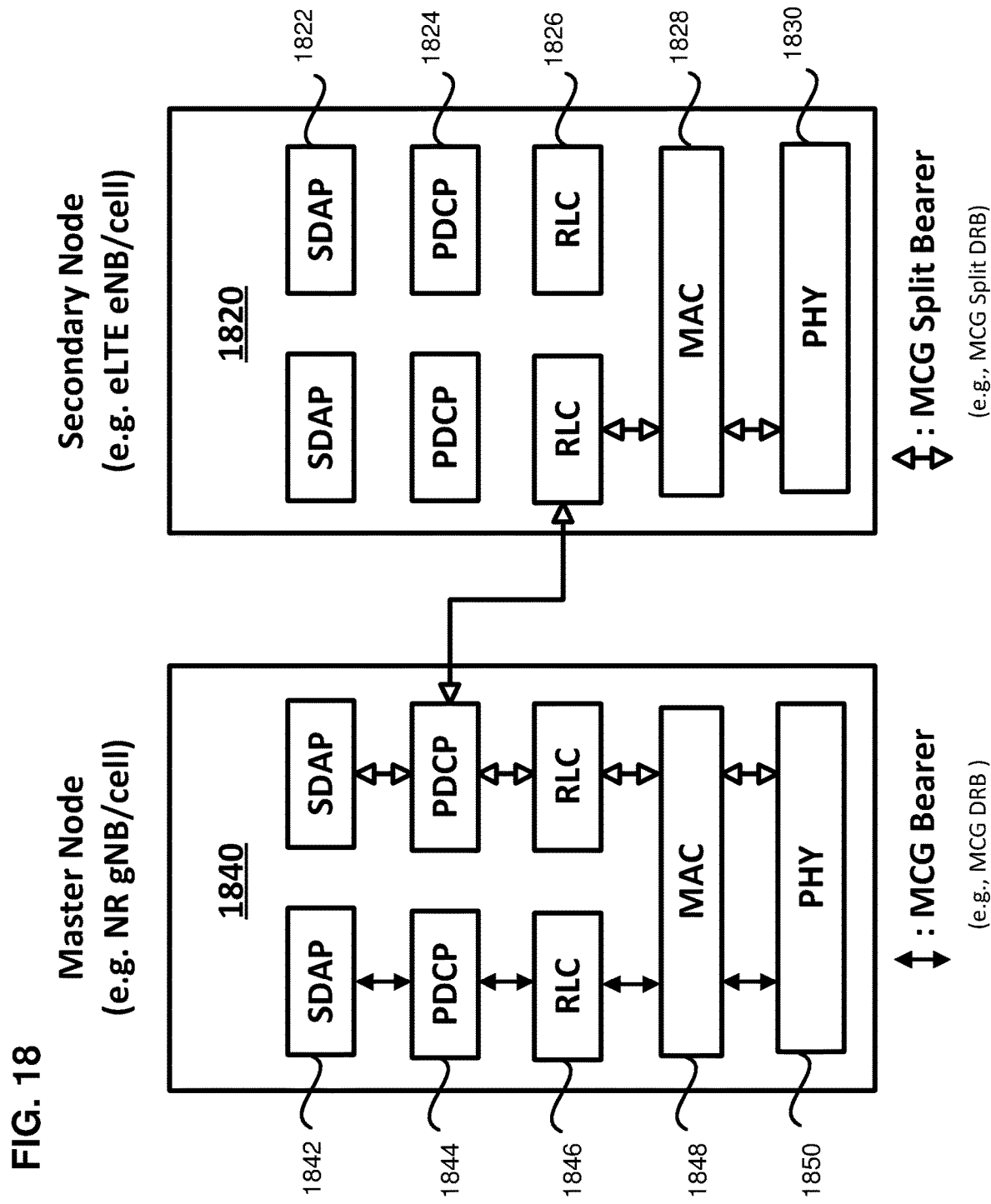
FIG. 18 is a diagram illustrating an MCG bearer and an MCG split bearer with an NR gNB/cell as a master node, according to an exemplary implementation of the present disclosure.

FIG. 18 is a diagram illustrating an MCG bearer and an MCG split bearer (e.g., a split bearer) with an NR gNB/cell as a master node, according to an exemplary implementation of the present disclosure. When NR gNB/cell 1840 is a master node, the network slice/service can be realized through an MCG bearer on its own or through an MCG split bearer if a secondary node supports the RAN part of slicing, as shown in FIG. 18. As shown in FIG. 18, NR gNB/cell 1840 may be a master node in an MCG, and may include SDAP layer 1842, PDCP layer 1844, RLC layer 1846, MAC layer 1848, and PHY layer 1850. eLTE eNB/cell 1820 may be a secondary node in the SCG, and may include SDAP layer 1822, PDCP layer 1824, RLC layer 1826, MAC layer 1828, and PHY layer 1830. The MCG bearer and MCG split bearer in FIG. 18 may be substantially similar to the MCG bearer and MCG split bearer, respectively, as described with reference to FIG. 10. Thus, the details of the MCG bearer and MCG split bearer are omitted for brevity.

Figure 19:
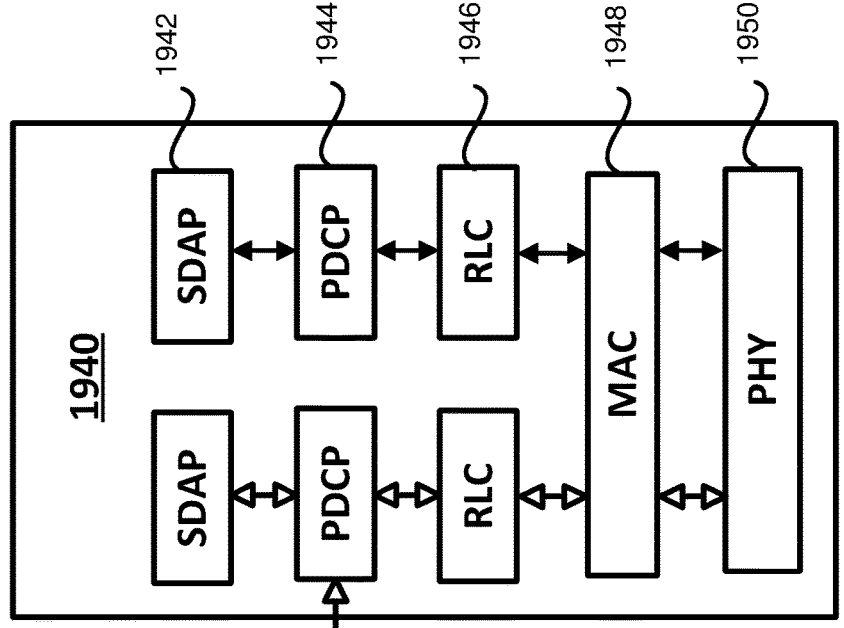
FIG. 19 is a diagram illustrating SCG bearer and SCG split bearer with an NR gNB/cell as a secondary node, according to an exemplary implementation of the present disclosure.
Figure 19:
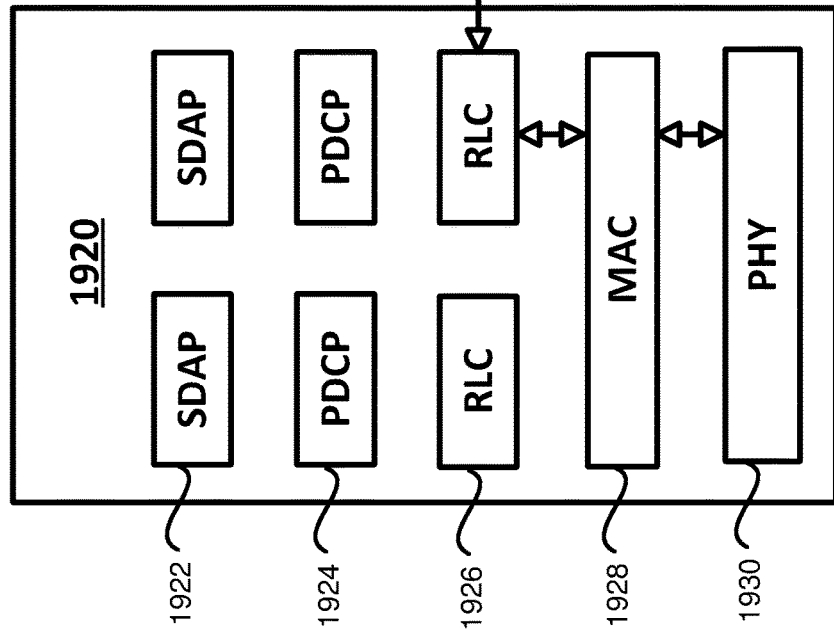

FIG. 19 is a diagram illustrating an SCG bearer and an SCG split bearer (e.g., a split bearer) with an NR gNB/cell as a secondary node, according to an exemplary implementation of the present disclosure. When NR gNB/cell 1940 is a secondary node, an SCG bearer may be used to provide the network slice/service. Also, an SCG split bearer can be used to provide the network slice/service if a master node supports the RAN part of slicing, as shown in FIG. 19.

As shown in FIG. 19, eLTE eNB/cell 1920 may be a master node in the MCG, and may include SDAP layer 1922, PDCP layer 1924, RLC layer 1926, MAC layer 1928, and PHY layer 1930. NR gNB/cell 1940 may be a secondary node in an SCG, and may include SDAP layer 1942, PDCP layer 1944, RLC layer 1946, MAC layer 1948, and PHY layer 1950. The SCG bearer and SCG split bearer in FIG. 19 may be substantially similar to the SCG bearer and SCG split bearer, respectively, as described with reference to FIG. 11. Thus, the details of the SCG bearer and SCG split bearer are omitted for brevity.

Case 3: UE Monitors Network Slice Capability Provided by NR gNB/Cell.

An NR gNB/cell may broadcast its network slice capability either via minimum System Information (SI) or via other SI. If the information is provided by other SI, it can be broadcast or unicast by the NR gNB/cell. Upon receiving the SI, a UE can identify whether it is able to perform the required/requested network slice/service to the secondary node. The NR gNB/cell may be in an MCG or an SCG. That is, the signaling for delivering the system information can be sent via an MCG SRB, an MCG split SRB, an SCG SRB, or an SCG split SRB. In another implementation, the system information message generated by the NR gNB/cell as a secondary node is embedded in a master node's RRC message, and delivered by the master node's RRC message.

Case 3A: UE Monitors NR gNB/Cell's Network Slice Capability Provided by Minimum SI of the NR gNB/Cell.

Figure 20:
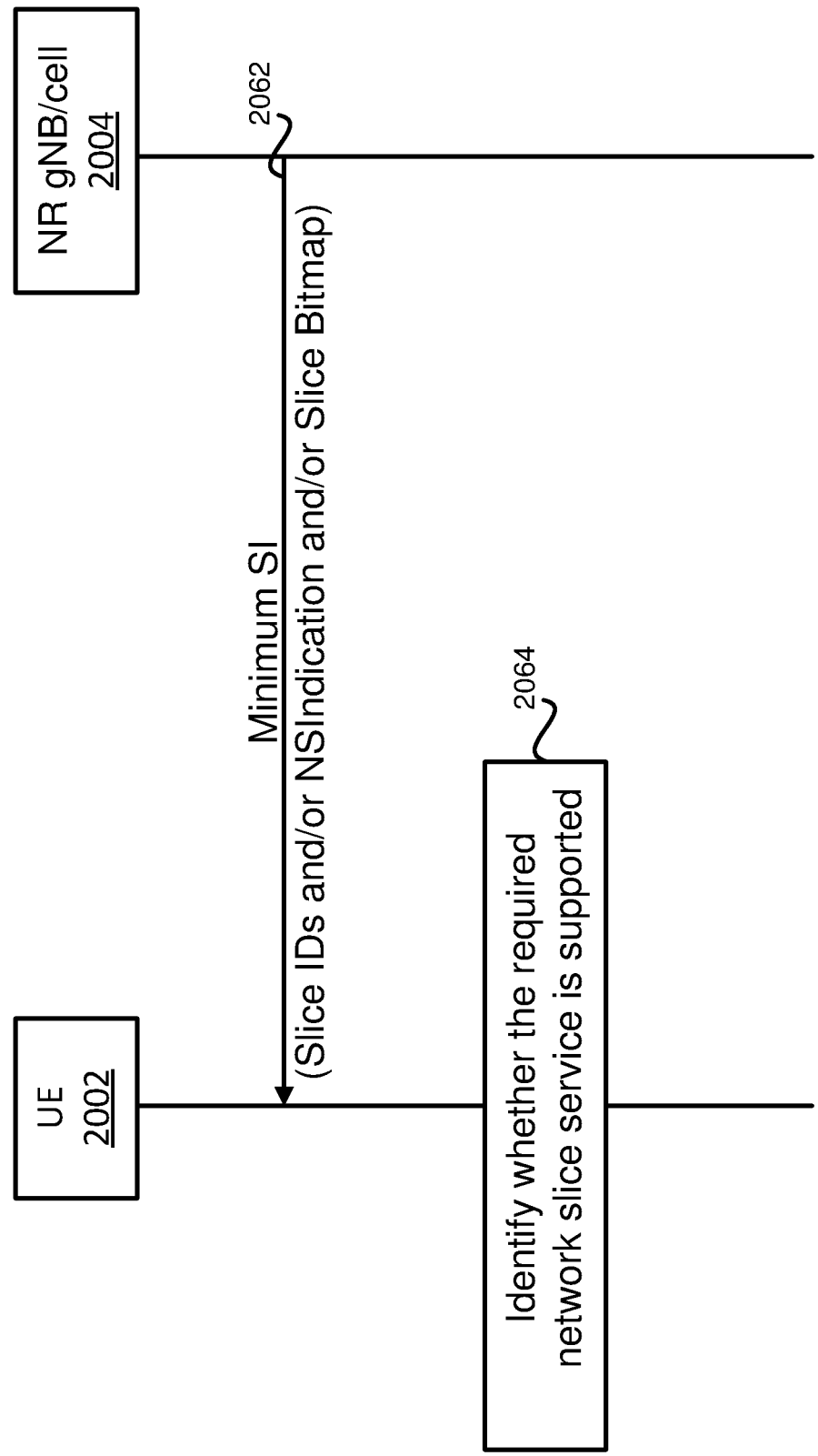
FIG. 20 is a diagram illustrating providing network slice via minimum SI, according to an exemplary implementation of the present disclosure.

FIG. 20 is a diagram illustrating providing network slice via minimum SI, according to an exemplary implementation of the present disclosure. As illustrated in FIG. 20, in action 2062, NR gNB/cell 2004 may broadcast minimum SI including Slice IDs and/or NS Indication and/or Slice Bitmap. If slice IDs are broadcast, NR gNB/cell 2004 directly informs the system (including UE 2002) what network slices/services are supported. Thus, UE 2002 can identify by itself whether the required/requested network slice/service is supported by NR gNB/cell 2004. When NR gNB/cell 2004 broadcasts an NS Indication, NR gNB/cell 2004 reveals its network slice capability instead of the exact supported network slices/services. As such, UE 2002 can further inquire/request NR gNB/cell 2004 about what exact network slice/service is supported via dedicated signaling if UE 2002 has the network slice/service requirement. When NR gNB/cell 2004 broadcasts a slice bitmap, NR gNB/cell 2004 explicitly reveals the specific supported network slices. In action 2064, UE 2002 may identify whether the required/requested network slice service is supported by NR gNB/cell 2004 based on the minimum SI broadcast by NR gNB/cell 2004.

Case 3B: UE Monitors NR gNB/Cell's Network Slice Capability Provided by Other SI of the NR gNB/Cell.

Figure 21:
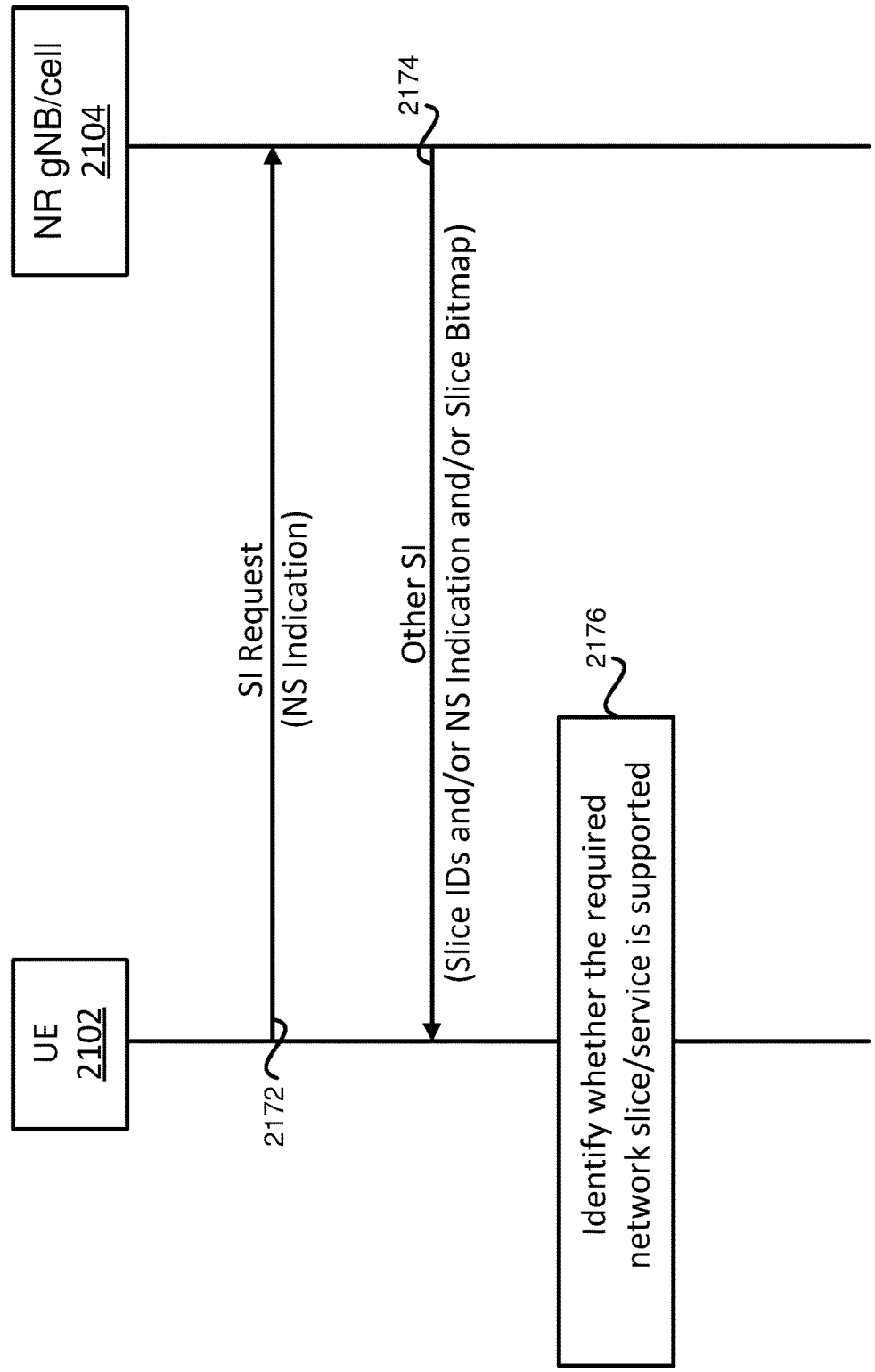
FIG. 21 is a diagram illustrating providing network slice via other SI, according to an exemplary implementation of the present disclosure.

FIG. 21 is a diagram illustrating providing network slice via other SI, according to an exemplary implementation of the present disclosure. In FIG. 21, NR gNB/cell 2104 may broadcast or unicast its network slice capability and/or the supported network slice/service via other SI (e.g., on demand SI). In action 2172, UE 2102 may first request the other SI from NR gNB/cell 2104 (e.g., via an SI Request message including NS Indication, which means UE 2102 needs more SI information regarding to the network slice/service from the NR gNB/cell.) In action 2174, NR gNB/cell 2104 may send a reply message including NR gNB/cell 2104's supported network slices/services (e.g., via Slice ID and/or Slice Bitmap) and/or its network slice capability (e.g., via NS Indication), in the other SI. In action 2176, UE 2102 may identify and/or determine whether the required/requested network slice/service is supported by NR gNB/cell 2104 based on the other SI from NR gNB/cell 2104.

Case 3C: UE Monitors Neighboring Cells' Network Slice Capabilities Provided by Other SI of the NR gNB/Cell.

Figure 22:
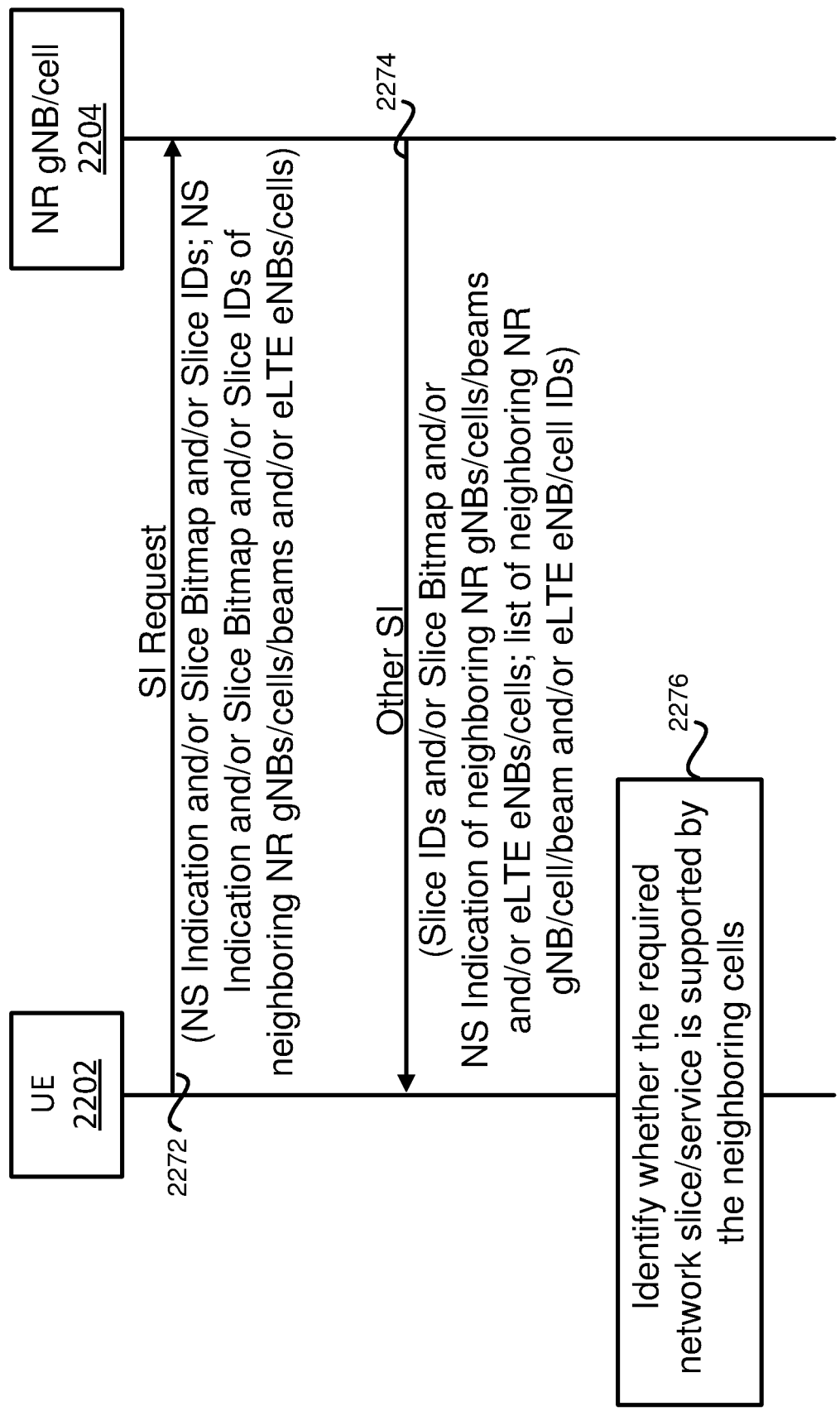
FIG. 22 is a diagram illustrating a neighboring cell's network slice via other SI, according to an exemplary implementation of the present disclosure.

FIG. 22 is a diagram illustrating a neighboring cell's network slice via other SI, according to an exemplary implementation of the present disclosure. As illustrated in FIG. 22, in action 2272, UE 2202 may send an RRC message (e.g., SI Request, such as an RRCSystemInfoRequest message) to NR gNB/cell 2204, where the RRC message may include NS Indication and/or Slice Bitmap and/or Slice IDs for asking network slice support, or NS Indication and/or Slice Bitmap and/or Slice IDs of neighboring NR gNB s/cells/beams and/or eLTE eNB s/cells for the network slice support from neighboring nodes/cells/beams. NR gNB/cell 2204 may reveal the neighboring gNB s/cells/beams' and/or eLTE eNB s/cells' supported network slices/services (e.g., with the combination of Slice IDs and/or Slice Bitmap and neighboring NR gNB/cell/beam and/or eLTE eNB/cell IDs) and/or the network slice capabilities (e.g., the combination of NS Indication and neighboring NR gNB/cell/beam and/or eLTE eNB/cell IDs, or only the neighboring NR gNB/cell/beam and/or eLTE eNB/cell IDs which support) in the other SI. In action 2276, UE 2202 may determine and/or identify whether the required/requested network slice/service is supported by any neighboring NR gNBs/cells/beams and/or eLTE eNBs/cells, based on which UE 2202 may further perform the mobility management procedures such as cell (re)selection, measurement, SCG-related procedures (e.g., change/addition/modification of secondary node), and MCG-related procedures (e.g., handover to another master node which supports the required/requested network slice/service, or the inter-MN handover without the change of the secondary node).

In some exemplary implementations, the UE may first check whether the serving NR gNB/cell or eLTE eNB/cell can support the required/requested network slice or network slice capability. If the serving NR gNB/cell or eLTE eNB/cell cannot support the required/requested network slice or network slice capability, the UE may further ask for information of neighboring NR gNBs/cells/beams and eLTE eNB s/cells for network slice support (e.g., as shown in FIG. 22). In some exemplary implementations, the UE may request for information of neighboring NR gNBs/cells/beams and eLTE eNB s/cells for network slice support via preamble, and/or MSG 3, and/or MSG 5. The NR gNB/cell may response with MSG 2 and/or MSG 4 and/or specific configured resources. It is noted that control signaling exchanged among the NR gNB/cell and the neighboring NR gNBs/cells and eLTE eNBs/cells may occur through/in Xx/Xn interface. The control signaling exchange may involve information exchange such as NS Indication of neighboring NR gNBs/cells/beams and/or eLTE eNBs/cells, and/or Slice IDs or Slice Bitmaps of neighboring NR gNBs/cells/beams and/or eLTE eNBs/cells, and/or the list of neighboring NR gNB/cell/beam and/or eLTE eNB/cell IDs.

Case 4: If UE's Required Network Slice/Service is not Supported by NR gNB/Cell and eLTE eNB/Cell, Mobility Management Procedures are Triggered to Fulfill UE's Required Network Slice/Service.

When a UE may recognize that the required/requested network slice/service is not supported by its master node and/or the secondary node, the UE, the master node, the secondary node, the core network, or any combination thereof may trigger mobility management procedures (e.g., intra-MN handover, inter-MN handover, intra-SN handover, inter-SN handover, MCG-related procedures, SCG-related procedures, inter-MN handover without the change of the secondary node, inter-SN handover without the change of the master node, secondary node change/addition/modification, or beam change/addition/modification) to satisfy the UE's required/requested network slice/service. It is noted that the master node and the secondary node can be the NR gNB/cell and/or the eLTE eNB/cell. It is noted that the selected master node or secondary node may or may not support the UE's required network slice/service. For example, the selected master node or secondary node may support the network slice/service, that is not required by the UE. In some implementations, the UE may request the required the network slice/service from the target master node or target secondary node. The result of the mobility management procedures may lead to dual connectivity or multi-connectivity.

The mobility management procedures may also involve information exchange in Xx/Xn interface and NG-C interface, such as UE ID, Slice IDs/Slice bitmap/NS Indication, target NR gNB/cell/beam or LTE eNB/cell or eLTE eNB/cell ID, and/or a list of suitable NR gNB/cell/beam IDs and/or LTE eNB/cell IDs and/or eLTE eNB/cell IDs, and/or specific preamble of the target NR gNB/cell or LTE eNB/cell or eLTE eNB/cell, and/or target NR SS block/burst/burst set configuration, and/or a list of suitable NR SS block/burst/burst set configurations.

Case 4A: Master Node Change—Handover to Another Master Node that Supports UE's Required Network Slice/Service.

A UE may perform handover to another master node, while the secondary node may remain unchanged. The UE may measure the signal from a couple of NR gNBs/cells and/or eLTE eNBs/cells, which support the UE's required/requested network slice/service or support the network slice.

The list of the NR gNBs/cells and/or eLTE eNBs/cells may be provided by the master node and/or the secondary node, for example, in the form of a list of (neighboring) NR gNB/cell and/or eLTE eNB/cell IDs/objects, which support the required/requested network slice/service and/or the network slice capability. The list of NR gNBs/cells and/or eLTE eNBs/cells, to which the UE measures signal, may be preconfigured. For example, the UE may be preconfigured to know on which frequency the required/requested network slice/service is provided.

Based on the measurement report, the UE may select the target master node on its own and report the decision to the source master node. In another implementation, the UE may report the measurement result to the source master node, and allow the source master node to select a target master node. It is noted that signaling in Xx/Xn interface among the source master node, the target master node, the source secondary node, and the target secondary node (if needed) may be utilized.

Case 4B: Secondary Node Change—(Re)Select a Secondary Node/Intra-SN Handover to Another Secondary Node/Modify Existing Secondary Node.

A UE may select or reselect a secondary node, intra-SN handover to another secondary node, or modify the existing secondary node, to support the required/requested network slice/service, while the master node may remain unchanged. The secondary node may be selected by the UE or by the master node based on measurement results. The reselected secondary node(s) may also be assigned by the core network (e.g., 5G-CN). For example, the UE may measure a number of NR gNB s/cells that support the required/requested network slice/service. The information of the number of NR gNB s/cells may be provided by the master node or the source secondary node to the UE, for example, in the form of a list of (neighboring) NR gNB/cell IDs/objects. In other cases, the UE may be preconfigured to know on which frequency the required/requested network slice/service is supported. It is noted that the selected secondary node may be NR gNBs/cells and/or eLTE eNBs/cells.

Based on the measurement report, the UE may select the target secondary node and report the decision to the source master node. In another implementation, the UE may report the measurement result to the source master node, and allow the source master node to select a target master node. It is noted that signaling in Xx/Xn interface among the source master node, the source secondary node, and the target secondary node may be utilized. In some implementations, the NG-C signaling exchange between the master node and the 5G-CN may be also needed. Thereafter, the corresponding RRC message exchange between the UE and the master node, or between the UE and the target secondary node, may be utilized.

Case 4C: Secondary Node Addition—Add a New Secondary Node that Supports UE's Required Network Slice/Service.

A UE may add a new secondary node that supports the required/requested network slice/service. The added secondary node may be an NR gNB/cell or an eLTE eNB/cell. The added secondary node may be selected by the UE, by the master node, by the existing secondary nodes, or by the core network (e.g., 5G-CN). The selection may be based on the measurement result and/or the matched supported network slice/service. For example, the UE may measure a number of NR gNBs/cells and/or eLTE eNB s/cells that support the required/requested network slice/service. The information of the number of NR gNBs/cells and/or eLTE eNBs/cells may be provided by the master node or the existing secondary nodes or the core network to the UE, for example, in the form of a list of (neighboring) NR gNB/cell IDs/objects and/or (neighboring) eLTE eNB/cell IDs/objects. In other cases, the UE may be preconfigured to know on which frequency the required/requested network slice/service is supported.

Based on the measurement report, the UE may select the new secondary node on its own and report the decision to the source master node and/or the existing secondary nodes. In another implementation, the UE may report the measurement result to the source master node and/or the existing secondary nodes, and allow the source master node and/or the existing secondary nodes to select a target master node. It is noted that the signaling in Xx/Xn interface among the source master node, the existing secondary nodes, and the added secondary node may be utilized. The NG-C signaling between the master node and the 5GC may also be needed. Thereafter, the corresponding RRC message exchange between the UE and the master node, and/or between the UE and the added secondary node and/or between the UE and the existing secondary nodes, may be utilized.

In some implementations, when the master node cannot support the network slice/service but the secondary node can, or when the secondary node cannot support the network slice/service but the master node can, the mobility management procedures in Cases 4A, 4B, and 4C can also be performed.

Case 5: UE Monitors eLTE eNB/Cell's Network Slice Capability Broadcast.

Figure 23:
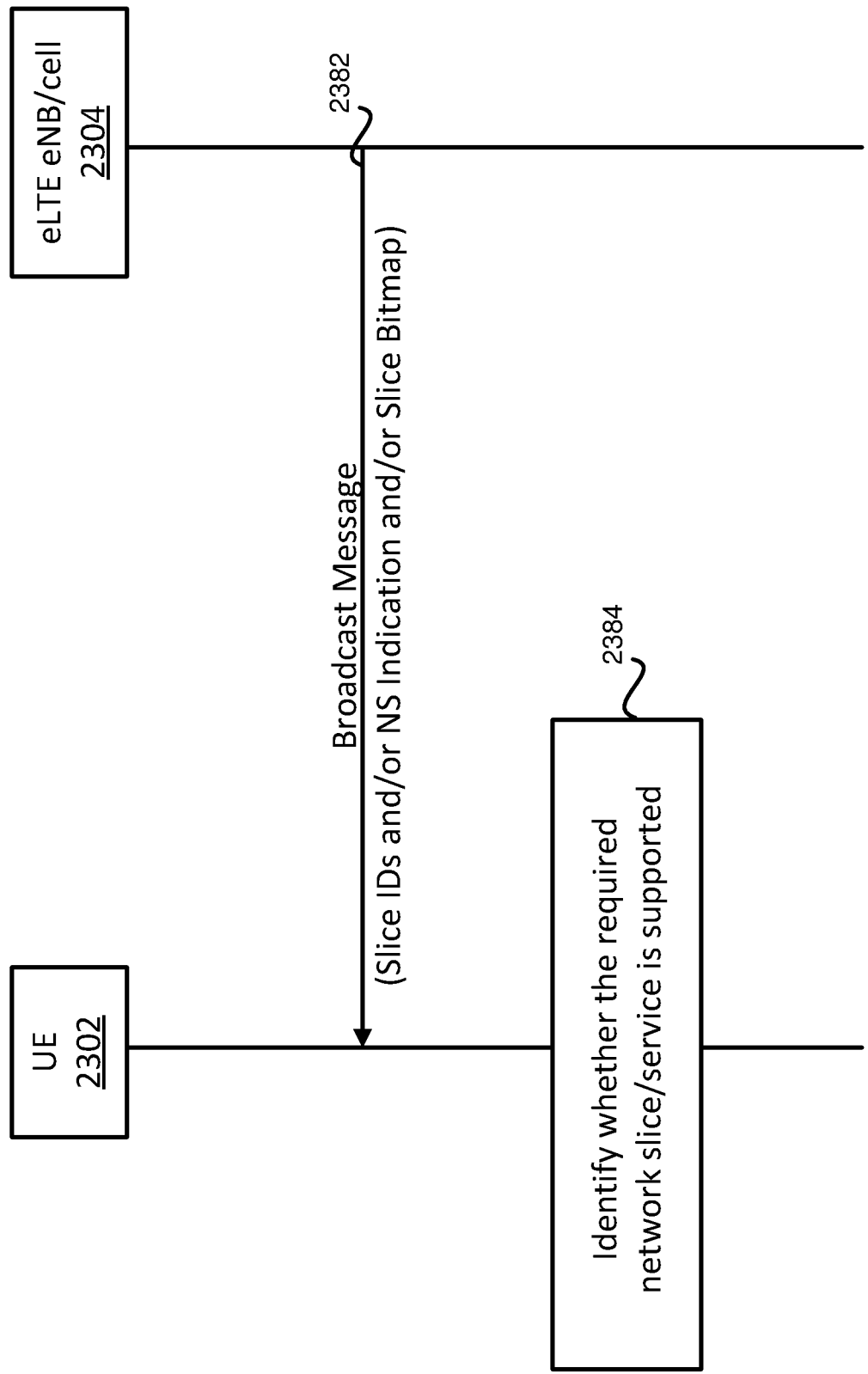
FIG. 23 is a diagram illustrating an eLTE eNB/cell broadcasting its network slice capability, according to an exemplary implementation of the present disclosure.

FIG. 23 is a diagram illustrating an eLTE eNB/cell broadcasting its network slice capability, according to an exemplary implementation of the present disclosure. As illustrated in FIG. 23, in action 2382, eLTE eNB/cell 2304, as a master node or a secondary node, may broadcast Slice IDs and/or NS Indication and/or Slice Bitmap. When slice IDs are broadcast, eLTE eNB/cell 2304 may directly inform UE 2302 what network slices/services are supported. In action 2384, UE 2302 may determine or identify whether the required/requested network slice/service is supported by the eLTE eNB/cell. When an NS Indication is broadcast, eLTE eNB/cell 2304 may reveal its network slice capability instead of the exact network slice/service supported. UE 2302 may further inquire or request the eLTE eNB/cell 2304 about exactly what network slice/service is supported by eLTE eNB/cell 2304 via dedicated signaling if UE 2302 has the network slice/service requirement. When a slice bitmap is broadcast, eLTE eNB/cell 2304 may explicitly reveal the specific supported network slices. It is noted that the broadcast message (e.g., System Information Block (SIB)) may be delivered via an MCG SRB, an MCG split SRB, an SCG SRB, or an SCG split SRB.

Case 6: Idle/Inactive UE Camps to a Suitable RAT that Supports UE's Required Network Slice During Cell (Re) Selection.

An idle/inactive UE may camp or select/reselect a cell of a suitable RAT that supports the required/requested network slice/service.

Case 6A: UE's NAS is Preconfigured to have Information of Network Slice Support.

Figure 24:
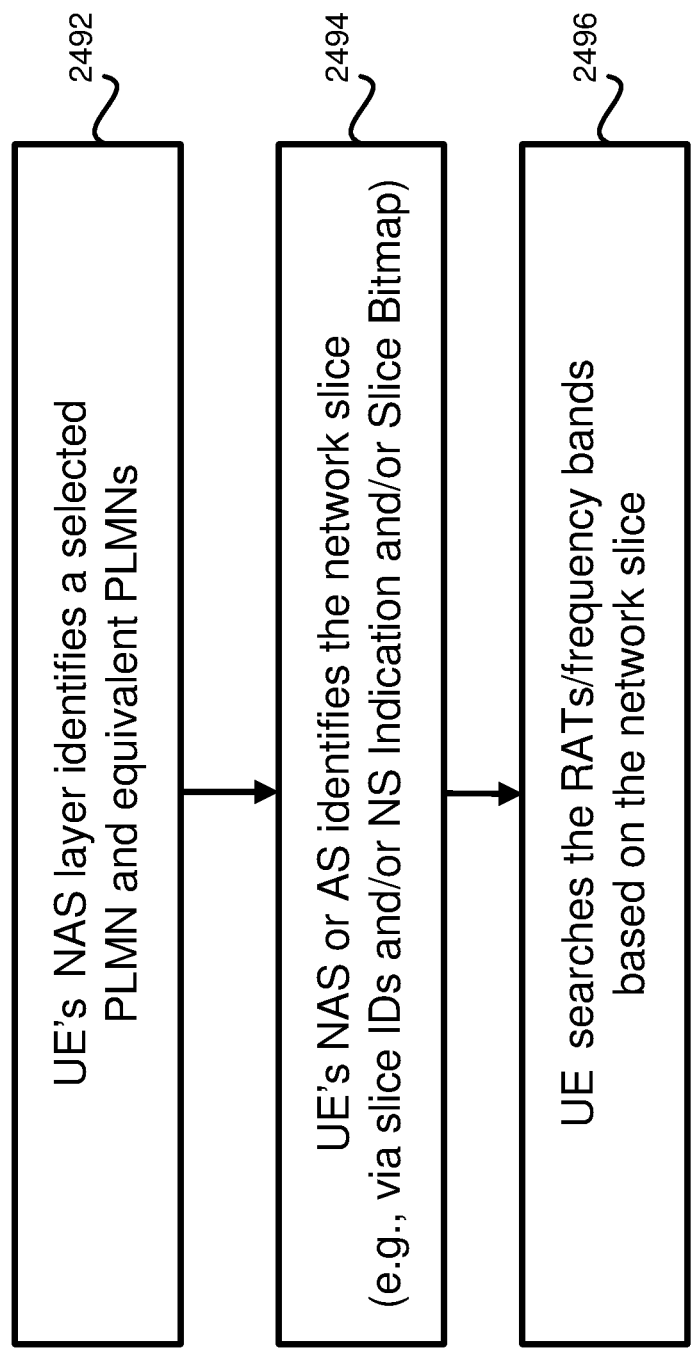
FIG. 24 is a diagram illustrating cell (re)selection based on network slice, according to an exemplary implementation of the present disclosure.

FIG. 24 is a diagram illustrating cell (re)selection based on network slice, according to an exemplary implementation of the present disclosure. In action 2492, a UE's Non Access Stratum (NAS) may first identify a selected PLMN (Public Land Mobile Network) and the equivalent PLMNs. The UE's NAS is preconfigured to have the information of which RAT/frequency band supports the network slice or even specific network slice/service. The UE's NAS may forward the information to the Access Stratum (AS). As such, the UE' AS with network slice requirement may monitor and measure signal from/on the RATs/frequency bands. In FIG. 24, in action 2494, the UE's NAS or AS may identify the required/requested network slice/service and/or the network slice support (e.g., via slice IDs and/or NS Indication and/or Slice Bitmap). In action 2496, the UE may search the RATs/frequency bands on which the required/requested network slice/service and/or network slice capability are supported. It is noted that the RATs/frequency bands that the UE monitors on may be associated with the selected PLMN or the equivalent PLMNs. In other implementations, the AS may try to receive/measure all RATs/frequency bands, and acquire relative slicing information. After collecting the slicing information, the AS forwards the information to the NAS, which may decide which RATs/frequency bands are appropriate. Thereafter, the NAS may notify its decision to the AS, and perform RRC connection establishment with the corresponding RAT/frequency. It is noted that the AS may filter out the RATs/frequency bands with signal quality below a predetermined threshold.

Case 6B: UE Performs Cell (Re)Selection and Camps to a RAT that Supports Required Network Slice Based on a List of Barred Cells.

A UE is (pre)configured with a list of barred cells, which cannot support network slice and/or specific network slice/service. In some implementations, the UE is (pre)configured with a list of barred cells, which cannot generally support the network slices. In some implementations, the UE is (pre)configured with a list of barred cells for each specific network slice. For example, for each slice ID, there is a list of barred cells. The UE may be (pre)configured with the relationship between a portion (or all) of the slices and their corresponding lists of barred cells. The list of barred cells can be a list of barred cells' IDs. The list may be preconfigured and/or modified when the UE receives the broadcast information from NR gNBs/cells and eLTE eNBs/cells about their network slice supports. With the list, after the UE may determine the PLMNs and performs measurement, the suitable cells to camp on can be selected based on the list of barred cells.

Case 7: eLTE eNB/Cell Performs Inter-System Intra-RAT Handover to Support UE's Required Network Slice.

Figure 25:
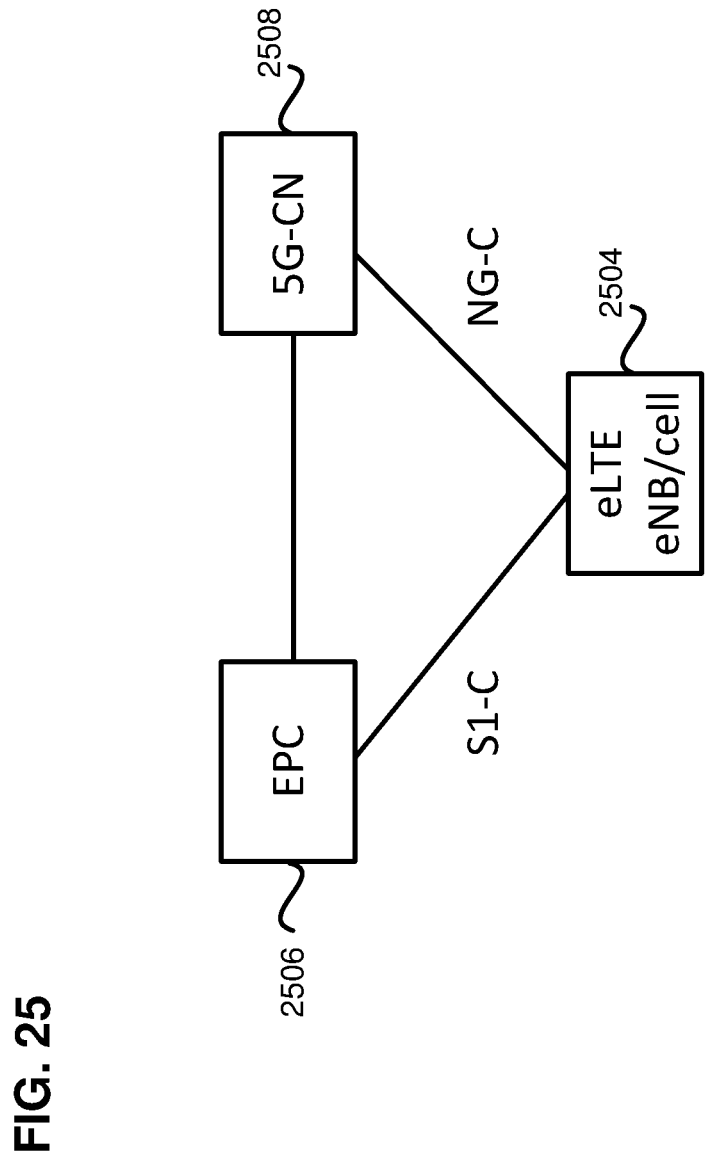
FIG. 25 is a diagram illustrating inter-system intra-RAT handover, according to an exemplary implementation of the present disclosure.

When an eLTE eNB/cell needs to support a network slice, the eLTE eNB/cell may perform inter-system intra-RAT handover, as shown in FIG. 25, for example, from Case 500D in FIG. 5D to Case 500B in FIG. 5B. FIG. 25 is a diagram illustrating inter-system intra-RAT handover, according to an exemplary implementation of the present disclosure. In the inter-system intra-RAT handover, the S1-C and NG-C interfaces may involve slice-related information exchange, which includes, for example, capability of network slice support and/or the types of network slices (e.g., RAN slice ID and/or CN slice ID). In the inter-system intra-RAT handover, NAS signaling carried in the RRC message including the slice information may be utilized in a Uu interface, when the eLTE eNB/cell changes the serving core network of the UE. In some implementations, the UE may connect with EPC 2506 and 5G-CN 2508 simultaneously. In such case, the UE may connect with a source CN (e.g., EPC 2506 or 5G-CN 2508) through eLTE eNB 2504. eLTE eNB 2504 may assist the UE to connect with a target CN while the original connection with the source CN is still kept by eLTE eNB 2504. This situation may happen when the UE's required/requested network slice is served by a specific CN. For example, the UE is connected with EPC 2506, then wants to activate a service, such as URLLC, which can be provided only by 5G-CN 2508's network slice. The UE needs to inform eLTE eNB 2504 that it is capable to connect with EPC 2506 and 5G-CN 2508 simultaneously. eLTE eNB 2504 may also need to inform the UE that eLTE eNB 2504 is capable to connect with EPC 2506 and 5G-CN 2508 simultaneously. Once the UE is connected with EPC 2506 and 5G-CN 2508 simultaneously, the UE may keep two different upper layers (e.g., one NAS layer for EPC 2506, and another NAS layer for 5G-CN 2508). In another example, the UE may have one upper layer but two separate configurations (e.g., two instances, one for EPC 2506, and another one for 5G-CN 2508). That is, a shared upper layer (e.g., NAS) and two independent configurations (e.g., instances) for EPC 2506 and 5G-CN 2508.

Case 8: UE Performs Mobility Management to Change Anchor Node to Target NR gNB/Cell or eLTE eNB/Cell.

A UE may perform mobility management to change its anchor node to a target NR gNB/cell or eLTE eNB/cell that supports the UE's required/updated network slice. In some implementations, the network slice in the source NR gNB/cell or eLTE eNB/cell is maintained. The UE may maintain the original network slice in the source NR gNB/cell or eLTE eNB/cell.

In some implementations, when the UE performs mobility management to change the anchor to the target NR gNB/cell or eLTE eNB/cell, which supports the UE's required/requested network slice, the configuration for new radio bearers (e.g., SDAP/PDCP/RLC/MAC/PHY configuration) to realize the network slice in the target NR gNB/cell or eLTE eNB/cell is provided to the UE by the source/target NR gNB/cell or eLTE eNB/cell.

In some implementations, the configuration for new radio bearers (e.g., SDAP/PDCP/RLC/MAC/PHY configuration) to realize the UE's request network slice in the target NR gNB/cell or eLTE eNB/cell may be provided to the UE by the source NR gNB/cell or eLTE eNB/cell. The UE may keep the control plane anchor to the source/target NR gNB/cell or eLTE eNB/cell.

Case 9: RAN Notification Area Update Considering UE's Network Slice Requirements.

Figure 26:
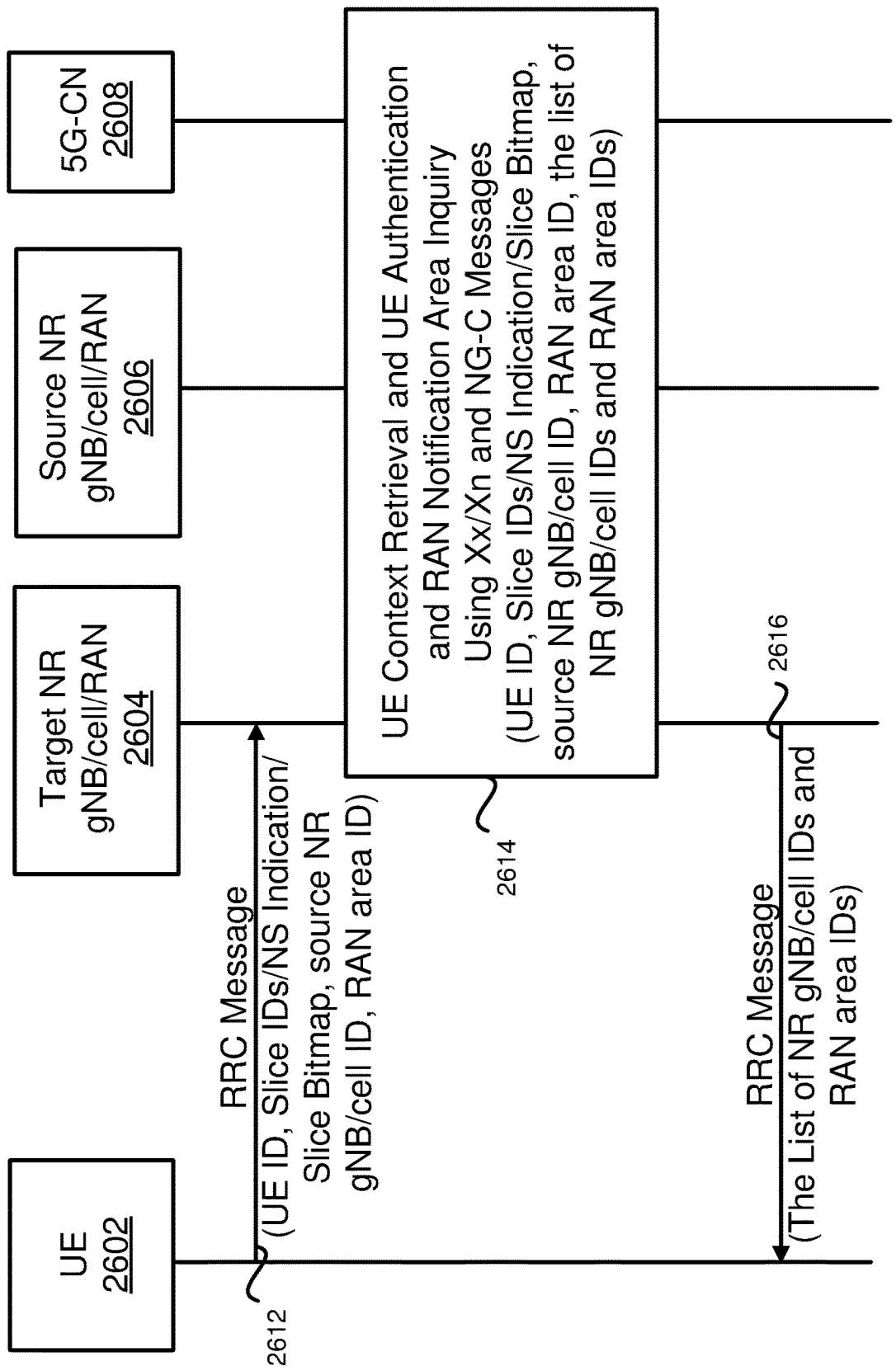
FIG. 26 is a diagram illustrating RAN notification area update with network slice support, according to an exemplary implementation of the present disclosure.

FIG. 26 is a diagram illustrating RAN notification area update with network slice support, according to an exemplary implementation of the present disclosure. For example, when UE 2602 is in RRC_INACTIVE state and has some network slices, a RAN notification area update procedure may consider UE 2602's network slice requirements. When RRC_INACTIVE UE 2602 moves out of the RAN notification area, and finds the received RAN area ID and/or NR gNB/cell ID (e.g., from target NR gNB/cell/RAN 2604) is not in its RAN notification area (e.g., source NR gNB/cell/RAN 2606), in action 2612, UE 2602 may send an RRC message (e.g., RRC Resume) including its UE ID and/or source NR gNB/cell 2606's ID and/or source RAN area ID and/or NS Indication/Slice ID/Slice Bitmap to target NR gNB/cell/RAN 2604. The cause of the RRC message sent by the UE may be "RAN notification area update request". Source NR gNB/cell 2606's ID and source RAN area ID are in the UE's original RAN notification area. In action 2614, target NR gNB/cell/RAN 2604 may perform UE context retrieval and UE authentication and RAN notification area inquiry with 5G-CN 2608 and/or source NR gNB/cell/RAN 2604. Xx/Xn signaling and NG-C signaling including UE 2602's ID and UE 2602's slice ID, NS Indication, and/or Slice Bitmap may be utilized for target NR gNB/cell/RAN 2604 to confirm UE 2602's status, to retrieve UE 2602's context from source NR gNB/cell/RAN 2606, and to coordinate with 5G-CN 2608 and/or source NR gNB/cell/RAN 2606 for the list of possible NR gNBs/cells/RANs with UE 2602's corresponding network slice support and requirement from 5G-CN 2608 and/or source NR gNB/cell/RAN 2606. Therefore, the RRC message (e.g., RAN notification area update message) sent from target NR gNB/cell/RAN 2604 to UE 2602 may include the NR gNB/cell IDs and/or RAN area IDs which support UE 2602's network slice. The cause of this RRC message may be RAN notification area update. For example, the RAN notification area update message sent to UE 2602 includes the IDs of NR gNB/cell and/or RAN area IDs, which support UE 2602's network slice requirements and/or the specific network slice. That is, when 5G-CN 2608 and/or NR gNB/cell/RAN 2604/2606 determine the RAN notification area for UE 2602, only the NR gNBs/cells and/or RANs which can support UE 2602's network slice requirement and/or the specific slice are considered.

In some implementations, for example, the NR gNBs/cells/RANs in the updated RAN notification area may not support the UE's network slice requirement. Thus, the UE may not camp to the NR gNBs/cells/RANs in the updated RAN notification area which does not support its network slice. That is, whatever the updated RAN notification area is, the inactive UE may only camp to an NR gNB/cell provided in the updated RAN notification area message, where the NR gNB/cell supports the UE's network slice requirement and/or the specific network slice. In such case, the RAN notification area determined by the core network and/or NR gNB/cell for the inactive UE is not based on the UE's network slice requirement and/or specific slice. However, the UE may only camp to the NR gNB/cell and/or RAN in the indicated RAN notification area, which can support the UE's network slice requirement. The UE may determine whether an NR gNB/cell supports the UE's network slice requirement and/or the specific network slice based on the NR gNB/cell's broadcast message, which may include NS Indication and/or Slice IDs and/or Slice Bitmap.

In the aforementioned cases 1-9, whenever the UE responds to the NR gNB/cell and/or the eLTE eNB/cell with Slice IDs/NS Indication/Slice Bitmap/UE IDs/NS Indication of neighboring NR gNBs/cells/beams/NS Indication of neighboring eLTE eNBs/cells, the UE may utilize MSG 1, MSG 3 or MSG 5, which may also be utilized for communications between the LTE eNB/cells and the UE.

Figure 27:
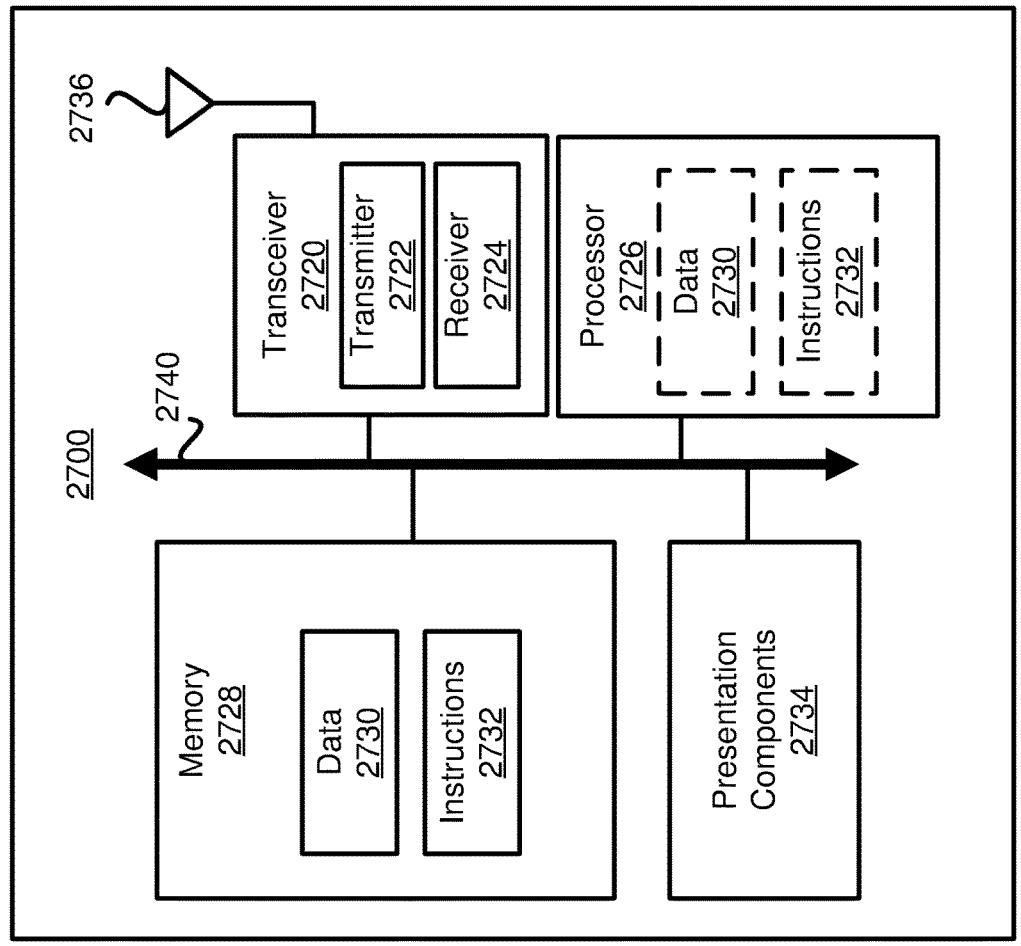
FIG. 27 is a block diagram of a node for wireless communication, in accordance with various aspects of the present disclosure.

FIG. 27 illustrates a block diagram of a node for wireless communication, in accordance with various aspects of the present application. As shown in FIG. 27, node 2700 may include a transceiver 2720, a processor 2726, a memory 2728, one or more presentation components 2734, and at least one antenna 2736. The node 2700 may also include an RF spectrum band module, a base station communications module, a network communications module, and a system communications management module, input/output (I/O) ports, I/O components, and power supply (not explicitly shown in FIG. 27). Each of these components may be in communication with each other, directly or indirectly, over one or more buses 2740.

The transceiver 2720 having a transmitter 2722 and a receiver 2724 may be configured to transmit and/or receive time and/or frequency resource partitioning information. In some implementations, the transceiver 2720 may be configured to transmit in different types of subframes and slots including, but not limited to, usable, non-usable and flexibly usable subframes and slot formats. The transceiver 2720 may be configured to receive data and control channels.

The node 2700 may include a variety of computer-readable media. Computer-readable media can be any available media that can be accessed by the node 2700 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 2728 may include computer-storage media in the form of volatile and/or non-volatile memory. The memory 2728 may be removable, non-removable, or a combination thereof. Exemplary memory includes solid-state memory, hard drives, optical-disc drives, and etc. As illustrated in FIG. 27, The memory 2728 may store computer-readable, computer-executable instructions 2732 (e.g., software codes) that are configured to, when executed, cause the processor 2726 to perform various functions described herein, for example, with reference to FIGS. 1A through 26. Alternatively, the instructions 2732 may not be directly executable by the processor 2726 but be configured to cause the node 2700 (e.g., when compiled and executed) to perform various functions described herein.

The processor 2726 may include an intelligent hardware device, e.g., a central processing unit (CPU), a microcontroller, an ASIC (Application Specific Integrated Circuit), and etc. The processor 2726 may include memory. The processor 2726 may process the data 2730 and the instructions 2732 received from the memory 2728, and information through the transceiver 2720, the base band communications module, and/or the network communications module. The processor 2726 may also process information to be sent to the transceiver 2720 for transmission through the antenna 2736, to the network communications module for transmission to a core network.

One or more presentation components 2734 presents data indications to a person or other device. Exemplary presentation components 2734 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

[1] 3GPP TR 38.801, "Study on New Radio Access Technology; Radio Access Architecture and Interfaces".
[2] RAN2 #94 Chairman notes.
[3] TR 38.804, "Study on New Radio Access Technology; Radio Interface Protocol Aspects".
[4] TR 38.801, "Study on New Radio Access Technology; Radio Access Architecture and Interfaces".
[5] TR 23.799, "Study on Architecture for Next Generation System".

What is claimed is:

1. A user equipment (UE) comprising:
a non-transitory computer-readable medium storing computer-executable instructions; and
at least one processor coupled to the non-transitory computer-readable medium, and configured to execute the computer-executable instructions to:
determine whether a required network slice/service of the UE is supported by a first network node, the required network slice/service uniquely identified by Single Network Slice Selection Assistance Information (S-NSSAI);
receive, from the first network node, information of a second network node that supports the required network slice/service of the UE with the S-NSSAI for uniquely identifying the required network slice/service when the required network slice/service identified by the S-NSSAI of the UE is not supported by the first network node;
perform at least one of a plurality of mobility management procedures based on the information of the second network node received from the first network node when the required network slice/service identified by the S-NSSAI of the UE is not supported by the first network node,
wherein the plurality of mobility management procedures comprises:
selecting a master node (MN), performing intra-MN handover without MN change, or performing inter-MN handover to another MN;
selecting or reselecting a secondary node (SN), performing intra-SN handover without SN change, modifying an existing SN, or adding a new SN; and
changing an anchor node of the UE to a target new radio (NR) next generation node B (gNB) or a target evolved long term evolution (eLTE) evolved node B (eNB); and
receive a radio access network (RAN) notification area update through a fifth generation (5G) core network that supports network slicing, the RAN notification area update including at least one of a list of NR gNB/cell Identifiers (IDs) or a list of RAN area IDs, the list of NR gNB/cell IDs corresponding to a list of NR gNBs/cells that support the required network slice/service of the UE, and the list of RAN area IDs corresponding to a list of RAN areas that support the required network slice/service of the UE.

2. The UE of claim 1, wherein the at least one processor is further configured to execute the computer-executable instructions to:
send a System Information (SI) request to the first network node; and
receive network slice capability in other SI broadcast or unicast by the first network node,
wherein the network slice capability indicates one or more network slices or services supported by the first network node.

3. The UE of claim 2, wherein at least one of minimum SI or the other SI includes at least one of a Slice Identifier (ID), a Network Slice Indication, and a Slice Bitmap.

4. The UE of claim 2, wherein the at least one processor is further configured to execute the computer-executable instructions to:
send a radio resource control (RRC) message to the first network node to request network slice support information of at least one neighboring network node;
receive the network slice support information of the at least one neighboring network node from the other SI broadcast or unicast by the first network node; and
determine, based on the network slice support information, whether the required network slice/service of the UE is supported by the at least one neighboring network node.

5. The UE of claim 1, wherein the first network node is connected to a fifth generation (5G) core network that supports network slicing.

6. The UE of claim 1, wherein at least one processor is further configured to execute the computer-executable instructions to measure signals from a list of neighboring network nodes broadcast or unicast by the first network node and selecting the MN or selecting or reselecting the SN based on the measurement.

7. The UE of claim 1, wherein:
a Non-Access Stratum (NAS) of the UE provides information of the required network slice/service to an Access Stratum (AS) of the UE;
the AS monitors signals from the first network node; and
the AS identifies the required network slice/service through at least one of a Slice Identifier (ID), a Network Slice Indication, and a Slice Bitmap from the signals.

8. The UE of claim 1, wherein the UE is configured to have a list of barred cells that do not support network slice capability for the UE.

9. A first network node comprising:
a non-transitory computer-readable medium storing computer-executable instructions; and
at least one processor coupled to the non-transitory computer-readable medium, and configured to execute the computer-executable instructions to:
provide network slice capability of the first network node to a user equipment (UE), the network slice capability indicating at least one network slice/service supported by the first network node;
transmit, to the UE, information of a second network node that supports a required network slice/service of the UE with Single Network Slice Selection Assistance Information (S-NSSAI) for uniquely identifying the required network slice/service when the required network slice/service identified by the S-NSSAI of the UE is not supported by the first network node; and
transmit, to the UE, a radio access network (RAN) notification area update through a fifth generation (5G) core network that supports network slicing, the RAN notification area update including at least one of a list of new radio (NR) next generation node B (gNB)/cell Identifiers (IDs) and a list of RAN area IDs, the list of NR gNB/cell IDs corresponding to a list of NR gNBs/ cells that support the required network slice/service of the UE, and the list of RAN area IDs corresponding to a list of RAN areas that support the required network slice/service of the UE.

10. The first network node of claim 9, wherein the first network node is in a master cell group or a secondary cell group.

11. The first network node of claim 9, wherein the first network node is connected to a fifth generation (5G) core network that supports network slicing.

12. The first network node of claim 9, wherein the at least one processor is further configured to execute the computer-executable instructions to broadcast or unicast the network slice capability via minimum System Information (SI) or other SI.

13. The first network node of claim 12, wherein at least one of the minimum SI or the other SI includes at least one of a Slice Identifier (ID), a Network Slice Indication, and a Slice Bitmap.

14. The first network node of claim 9, wherein the at least one processor is further configured to execute the computer-executable instructions to broadcast or unicast the network slice capability via a Signaling Radio Bearer (SRB).

15. The first network node of claim 9, wherein the at least one processor is further configured to execute the computer-executable instructions to:
receive a System Information (SI) request from the UE; and
broadcast or unicast the network slice capability in other SI to the UE.

16. The first network node of claim 9, wherein the at least one processor is further configured to execute the computer-executable instructions to:
broadcast or unicast network slice support information of at least one neighboring network node to the UE.

17. The first network node of claim 16, wherein the at least one neighboring network node is connected to a fifth generation (5G) core network that supports network slicing.

18. The first network node of claim 9, wherein the at least one processor is further configured to execute the computer-executable instructions to provide a list of barred cells that do not support the network slice capability for the UE.

* * * * *